(12) United States Patent
Lovitt et al.

(10) Patent No.: US 10,176,808 B1
(45) Date of Patent: Jan. 8, 2019

(54) UTILIZING SPOKEN CUES TO INFLUENCE RESPONSE RENDERING FOR VIRTUAL ASSISTANTS

(71) Applicant: MICROSOFT TECHNOLOGY LICENSING, LLC, Redmond, WA (US)

(72) Inventors: Andrew William Lovitt, Redmond, WA (US); Kenneth Harry Cooper, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/628,616

(22) Filed: Jun. 20, 2017

(51) Int. Cl.
| | |
|---|---|
| *G10L 15/02* | (2006.01) |
| *G10L 15/06* | (2013.01) |
| *G10L 15/26* | (2006.01) |
| *G10L 13/04* | (2013.01) |
| *G10L 15/22* | (2006.01) |
| *G06F 17/30* | (2006.01) |
| *G06N 99/00* | (2010.01) |

(52) U.S. Cl.
CPC ........ *G10L 15/22* (2013.01); *G06F 17/30976* (2013.01); *G06F 17/30985* (2013.01); *G06N 99/005* (2013.01); *G10L 13/043* (2013.01); *G10L 15/063* (2013.01); *G10L 15/265* (2013.01); *G10L 2015/223* (2013.01)

(58) Field of Classification Search
CPC combination set(s) only.
See application file for complete search history.

(56) References Cited

U.S. PATENT DOCUMENTS

| | | | |
|---|---|---|---|
| 7,254,241 B2 | 8/2007 | Rui et al. | |
| 7,305,095 B2 | 12/2007 | Rui | |
| 7,343,289 B2 | 3/2008 | Cutler et al. | |
| 7,376,640 B1 * | 5/2008 | Anderson | G06F 17/3087 701/533 |
| 7,752,251 B1 * | 7/2010 | Shuster | G06F 15/16 709/200 |
| 7,890,328 B1 * | 2/2011 | Blanchard | G10L 15/063 704/244 |
| 8,107,401 B2 * | 1/2012 | John | G06Q 10/107 370/259 |
| 8,233,353 B2 | 7/2012 | Zhang et al. | |
| 8,706,503 B2 | 4/2014 | Cheyer et al. | |
| 8,712,943 B1 * | 4/2014 | Kim | G06Q 50/01 706/45 |

(Continued)

*Primary Examiner* — Anne L Thomas-Homescu
(74) *Attorney, Agent, or Firm* — NovoTechIP International PLLC

(57) ABSTRACT

Techniques for integrating a virtual assistant into a spoken conversation session, the techniques including receiving an utterance information that expresses an utterance spoken by a first participant included in a plurality of participants of a spoken conversation session; processing the utterance information using at least one machine-trained model to determine an intent or content for a command or query included in the utterance; selectively identifying a recipient subset of one or more of the plurality of participants based on at least the determined intent or content for the utterance; generating a response for the command or query; and providing, during the spoken conversation session, the response to the identified recipient subset.

20 Claims, 9 Drawing Sheets

(56) References Cited

U.S. PATENT DOCUMENTS

| | | | |
|---|---|---|---|
| 9,031,216 B1* | 5/2015 | Kamvar | H04L 12/1827 379/202.01 |
| 9,112,931 B1* | 8/2015 | Morrison | G06F 17/30864 |
| 9,229,974 B1* | 1/2016 | Lee | G06F 17/30424 |
| 9,471,638 B2 | 10/2016 | Roytman et al. | |
| 9,699,409 B1* | 7/2017 | Reshef | H04N 7/155 |
| 9,788,048 B2* | 10/2017 | Collart | H04N 21/4325 |
| 9,812,151 B1* | 11/2017 | Amini | G10L 21/10 |
| 9,842,584 B1* | 12/2017 | Hart | G10L 15/00 |
| 9,858,335 B2* | 1/2018 | Chakra | G06F 17/30684 |
| 9,864,487 B2* | 1/2018 | D'Angelo | G06F 3/0482 |
| 2002/0161578 A1* | 10/2002 | Saindon | G06F 17/289 704/235 |
| 2002/0161579 A1* | 10/2002 | Saindon | G06F 17/28 704/235 |
| 2003/0105959 A1* | 6/2003 | Matyas, Jr. | G06F 21/31 713/168 |
| 2003/0177009 A1* | 9/2003 | Odinak | H04M 3/51 704/260 |
| 2003/0187925 A1* | 10/2003 | Inala | G06F 17/243 709/204 |
| 2004/0205065 A1* | 10/2004 | Petras | B01D 3/146 |
| 2004/0249637 A1* | 12/2004 | Baker | G10L 15/1822 704/239 |
| 2005/0002502 A1* | 1/2005 | Cloran | G06Q 10/06311 379/88.18 |
| 2005/0105712 A1* | 5/2005 | Williams | G10L 13/027 379/265.02 |
| 2005/0135571 A1* | 6/2005 | Bangalore | G06Q 10/06311 379/88.01 |
| 2006/0026593 A1* | 2/2006 | Canning | G06F 9/4843 718/100 |
| 2006/0080107 A1* | 4/2006 | Hill | G10L 15/1822 704/275 |
| 2006/0111948 A1* | 5/2006 | Kivatinetz | G06Q 10/10 705/4 |
| 2006/0117388 A1* | 6/2006 | Nelson | G06F 11/008 726/25 |
| 2006/0150119 A1* | 7/2006 | Chesnais | G06F 17/30401 715/810 |
| 2007/0136264 A1* | 6/2007 | Tran | G06F 17/30867 |
| 2008/0021976 A1* | 1/2008 | Chen | G06F 17/3089 709/217 |
| 2008/0189162 A1* | 8/2008 | Ganong | G06F 17/3089 705/7.13 |
| 2008/0226051 A1* | 9/2008 | Srinivasan | H04L 12/1822 379/202.01 |
| 2008/0307320 A1* | 12/2008 | Payne | G06F 3/0481 715/751 |
| 2008/0319964 A1* | 12/2008 | Coury | G06F 17/30522 |
| 2009/0282103 A1* | 11/2009 | Thakkar | H04N 7/147 709/204 |
| 2010/0138416 A1* | 6/2010 | Bellotti | G06F 17/30032 707/736 |
| 2010/0153377 A1* | 6/2010 | Rajan | G06F 17/30528 707/723 |
| 2010/0223389 A1* | 9/2010 | Ananthanarayanan | G06F 21/57 709/229 |
| 2010/0251140 A1* | 9/2010 | Tipirneni | G06F 3/011 715/753 |
| 2010/0283829 A1* | 11/2010 | De Beer | G06F 17/289 348/14.09 |
| 2010/0293598 A1* | 11/2010 | Collart | G06F 17/30056 726/3 |
| 2010/0293608 A1* | 11/2010 | Schechter | G06F 17/2785 726/8 |
| 2011/0119389 A1 | 5/2011 | Cavin et al. | |
| 2011/0246910 A1* | 10/2011 | Moxley | G06F 17/30861 715/758 |
| 2011/0294106 A1* | 12/2011 | Lennox | G09B 7/00 434/322 |
| 2011/0317522 A1 | 12/2011 | Florencio et al. | |
| 2012/0275349 A1* | 11/2012 | Boyer | H04L 12/1822 370/261 |
| 2013/0201276 A1 | 8/2013 | Pradeep et al. | |
| 2013/0262595 A1* | 10/2013 | Srikrishna | G06F 17/30722 709/206 |
| 2014/0067375 A1* | 3/2014 | Wooters | G06F 17/28 704/9 |
| 2014/0067392 A1* | 3/2014 | Burke | G10L 15/22 704/236 |
| 2014/0122077 A1* | 5/2014 | Nishikawa | G10L 17/04 704/249 |
| 2014/0281890 A1* | 9/2014 | D'Angelo | G06F 17/30598 715/234 |
| 2014/0282870 A1* | 9/2014 | Markwordt | H04L 63/08 726/3 |
| 2014/0337989 A1* | 11/2014 | Orsini | H04L 51/12 726/26 |
| 2014/0344366 A1 | 11/2014 | Krantz et al. | |
| 2014/0365504 A1* | 12/2014 | Franceschini | G06F 17/30958 707/748 |
| 2014/0365584 A1* | 12/2014 | Abali | H04L 51/20 709/206 |
| 2014/0365921 A1* | 12/2014 | Gupta | G06F 3/04812 715/758 |
| 2015/0006171 A1* | 1/2015 | Westby | G10L 15/26 704/235 |
| 2015/0012984 A1 | 1/2015 | Vakil et al. | |
| 2015/0078332 A1 | 3/2015 | Sidhu et al. | |
| 2015/0186154 A1 | 7/2015 | Brown et al. | |
| 2015/0263995 A1* | 9/2015 | Mahood | H04L 51/04 715/753 |
| 2015/0271020 A1 | 9/2015 | Anantharaman et al. | |
| 2015/0348548 A1* | 12/2015 | Piernot | G10L 15/22 704/235 |
| 2016/0048583 A1* | 2/2016 | Ontko | G09B 7/00 707/769 |
| 2016/0077794 A1 | 3/2016 | Kim et al. | |
| 2016/0092160 A1* | 3/2016 | Graff | G01C 21/3641 704/257 |
| 2016/0093298 A1 | 3/2016 | Naik et al. | |
| 2016/0114247 A1 | 4/2016 | Biswas et al. | |
| 2016/0165064 A1 | 6/2016 | Thakkar et al. | |
| 2016/0165186 A1 | 6/2016 | Yee et al. | |
| 2016/0171980 A1 | 6/2016 | Liddell et al. | |
| 2016/0173578 A1* | 6/2016 | Sharma | G06F 17/2785 709/203 |
| 2016/0196499 A1 | 7/2016 | Khan et al. | |
| 2016/0203331 A1 | 7/2016 | Khan et al. | |
| 2016/0210363 A1 | 7/2016 | Rambhia et al. | |
| 2016/0218998 A1* | 7/2016 | Sheth | G06F 3/04842 |
| 2016/0239581 A1* | 8/2016 | Jaidka | G06F 17/30719 |
| 2016/0275952 A1 | 9/2016 | Kashtan et al. | |
| 2016/0307567 A1 | 10/2016 | Boies et al. | |
| 2016/0335138 A1 | 11/2016 | Surti et al. | |
| 2016/0335532 A1 | 11/2016 | Sanghavi et al. | |
| 2016/0350973 A1 | 12/2016 | Shapira et al. | |
| 2016/0360039 A1 | 12/2016 | Sanghavi et al. | |
| 2016/0373571 A1 | 12/2016 | Woolsey et al. | |
| 2016/0378426 A1 | 12/2016 | Davis et al. | |
| 2017/0011215 A1* | 1/2017 | Poiesz | G06F 21/52 |
| 2017/0018271 A1 | 1/2017 | Khan et al. | |
| 2017/0038829 A1 | 2/2017 | Lanier et al. | |
| 2017/0041296 A1* | 2/2017 | Ford | H04L 63/0421 |
| 2017/0048488 A1 | 2/2017 | Novak et al. | |
| 2017/0060848 A1 | 3/2017 | Liu et al. | |
| 2017/0061019 A1* | 3/2017 | Chitta | G06F 17/30861 |
| 2017/0085835 A1 | 3/2017 | Reitel et al. | |
| 2017/0092264 A1* | 3/2017 | Hakkani-Tur | G06N 99/005 |
| 2017/0115855 A1 | 4/2017 | Farouki | |
| 2017/0124447 A1 | 5/2017 | Chang et al. | |
| 2017/0126681 A1* | 5/2017 | Barrett | G06F 21/6245 |
| 2017/0140041 A1 | 5/2017 | Dotan-Cohen et al. | |
| 2017/0154637 A1* | 6/2017 | Chu | G09B 21/006 |
| 2017/0185375 A1* | 6/2017 | Martel | G06F 3/167 |
| 2017/0195338 A1* | 7/2017 | Richter | H04L 63/102 |
| 2017/0208022 A1* | 7/2017 | Drazin | H04L 51/046 |
| 2017/0213546 A1* | 7/2017 | Gilbert | G10L 15/065 |

(56) References Cited

U.S. PATENT DOCUMENTS

| | | | |
|---|---|---|---|
| 2017/0237692 A1* | 8/2017 | Sheth | H04L 51/02 |
| | | | 715/758 |
| 2017/0242845 A1* | 8/2017 | Clark | G06F 17/277 |
| 2017/0264745 A1* | 9/2017 | Odinak | H04M 3/5183 |
| 2017/0269816 A1* | 9/2017 | Bradley | G06F 3/04817 |
| 2017/0316775 A1* | 11/2017 | Le | G10L 15/16 |
| 2017/0353423 A1* | 12/2017 | Morrison | H04L 51/32 |
| 2018/0005161 A1* | 1/2018 | Cong | G06F 17/30424 |
| 2018/0039775 A1* | 2/2018 | Poiesz | G06F 21/6209 |
| 2018/0060599 A1* | 3/2018 | Horling | G06F 21/31 |
| 2018/0083792 A1* | 3/2018 | Wanderski | G06F 17/30997 |
| 2018/0129648 A1* | 5/2018 | Chakravarthy | G06F 17/289 |
| 2018/0143989 A1* | 5/2018 | Nomula | G06F 17/3053 |
| 2018/0182397 A1* | 6/2018 | Carbune | G10L 15/30 |
| 2018/0189267 A1* | 7/2018 | Takiel | G06F 17/271 |
| 2018/0189629 A1* | 7/2018 | Yatziv | G06N 3/006 |
| 2018/0212903 A1* | 7/2018 | Rose | H04L 51/04 |

* cited by examiner

US 10,176,808 B1

UTILIZING SPOKEN CUES TO INFLUENCE RESPONSE RENDERING FOR VIRTUAL ASSISTANTS

BACKGROUND

Progress in machine learning, language understanding, and artificial intelligence are changing the way users interact with computers. Virtual assistants, such as Siri™ Google Now™, Amazon Echo™, and Cortana™, are examples of a shift in human computer interaction. A user may rely on a virtual assistant to facilitate carrying out certain computer-implemented tasks. In operation, the user may directly issue a spoken command to the virtual assistant, such as by uttering, "Assistant, set up an appointment with John Smith on Tuesday at 10 o'clock AM." The virtual assistant applies natural language processing to interpret the user's spoken command, and then carries out the user's command. While virtual assistant technology now offers satisfactory availability, accuracy, and convenience, interacting with a virtual assistant represents an artificial human-machine exchange that departs from the typical manner in which users interact with their environments. A user often wants or needs to multi-task so that various tasks can be performed while communicating with others using devices such as smartphones or computers. However, attempting to multi-task during a spoken conversation can often lead to a disjointed, halting, or confusing interaction. Conventional solutions use some form of digital assistant that are available on a variety of computing platforms but the ability to employ them in useful ways during communications with another party is very limited.

SUMMARY

Techniques for integrating a virtual assistant into a spoken conversation session, the techniques including receiving an utterance information that expresses an utterance spoken by a first participant included in a plurality of participants of a spoken conversation session; processing the utterance information using at least one machine-trained model to determine an intent or content for a command or query included in the utterance; selectively identifying a recipient subset of one or more of the plurality of participants based on at least the determined intent or content for the utterance; generating a response for the command or query; and providing, during the spoken conversation session, the response to the identified recipient subset.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

Figure 1:
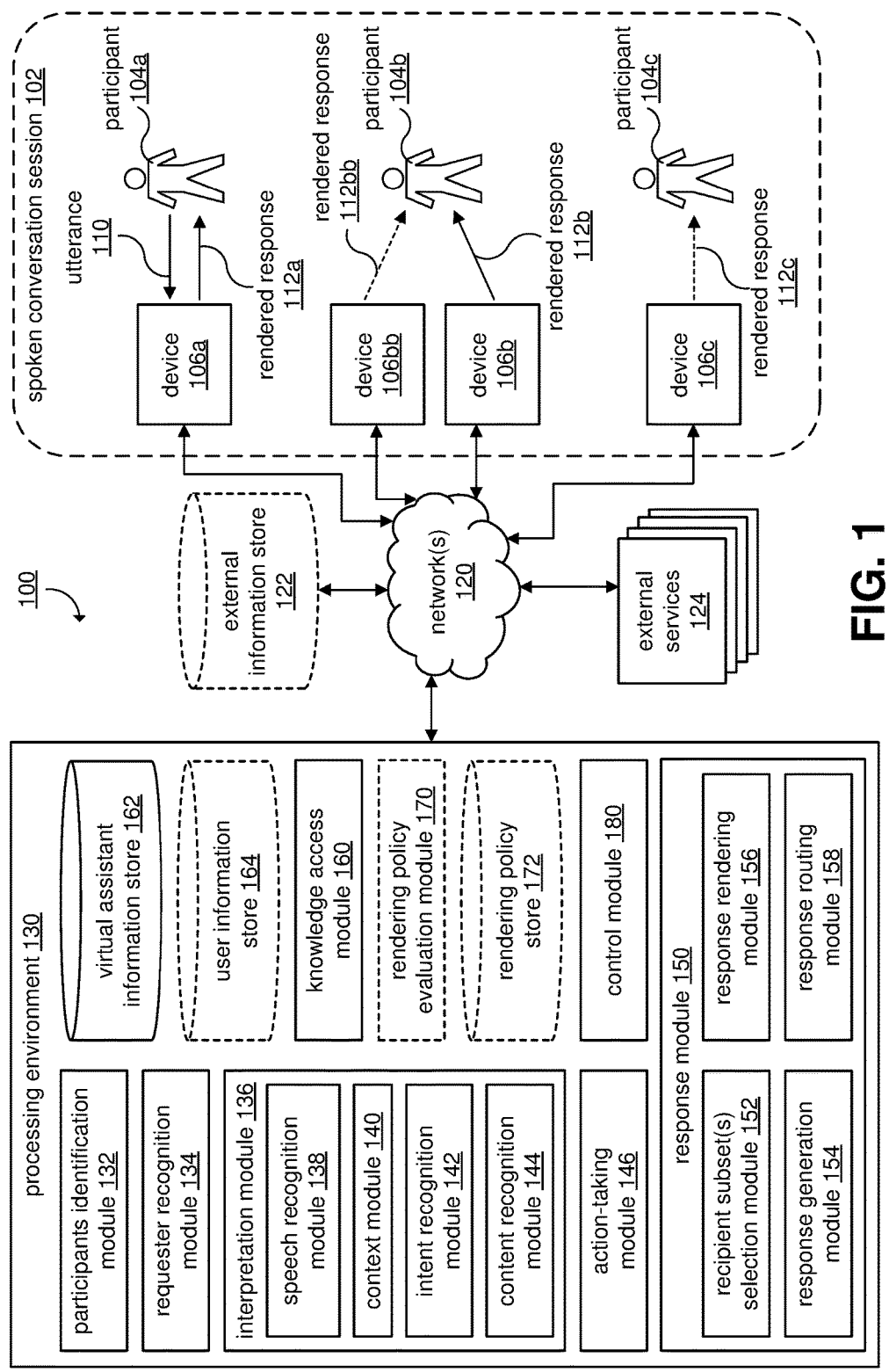
FIG. 1 illustrates a schematic example of a system including a processing environment configured to integrate a virtual assistant into a spoken conversation session.

FIG. 1 illustrates a schematic example of a system 100 including a processing environment 130 configured to integrate a virtual assistant into a spoken conversation session 102. The spoken conversation session 102 refers to a communication environment in which two or more participants (which may be referred to as "session participants") interact in real-time via spoken conversation. In the discussion directly presented herein, a spoken conversation session may simply be referred to as a "conversation" or "session." Multiple examples of spoken conversation sessions are described below. Although only a single conversation session 102 is illustrated in FIG. 1, it is understood that system 100 may be adapted to interact with practically any number of concurrent sessions. In the example illustrated in FIG. 1, there are three participants 104a, 104b, and 104c engaged in the session 102. Although three participants 104a, 104b, and 104c are illustrated for session 102, a session may include two or more participants. Not all of the participants need to actually speak during the session 102 (for example, there may only be a single "presenter" for session 102, such as for a lecture), and not all of the participants need to be capable of having their speech head by other participants (for example, one or more participants may be "listen only"). In some examples, a single participant may include multiple individual persons. For example, in some cases, a group of people commonly using a single device to participate in a session may be treated as a single participant. In some examples, the session 102 begins at a first time, continues for and during a period of time (having a respective duration), and ends at a second time. Participants may be added to and removed from the session 102 over a duration of the session 102. The session 102 may, in addition to speech, provide additional communication modalities for real-time interaction among the participants such as, but not limited to, streaming video of participants (such as for videoconferencing), messaging (such as a messaging interface included in a conferencing application), computer desktop sharing, application sharing, displaying presentation slides, and/or file sharing.

The participants 104a, 104b, and 104c may be, but are not required to be, in separate physical locations; for example, each of participants 104a, 104b, and 104c may be at a respective location apart from the other participants such that the participants 104a, 104b, and 104c cannot speak directly in person to one another. In other examples, two or more participants may be within the same location or room. In some examples, such as where two or more participants are in different physical locations, spoken conversation may be conveyed between and among participants 104a, 104b, and 104c by use of a telecommunication service (not individually illustrated in FIG. 1), such as the SKYPE™ service provided by Microsoft Corporation of Redmond, Wash., United States. Various examples of techniques and systems for telecommunications services supporting voice conversations among participants at different locations include U.S. Patent Application Publication Numbers US 2017/0115855 (titled "Interactive Whiteboard Sharing" and published on Apr. 27, 2017), US 2017/0048488 (titled "Dynamic Communication Portal Between Locations" and published on Feb. 16, 2017), US 2016/0165186 (titled "NUI Video Conference Controls" and published on Jun. 9, 2016), US 2016/0165064 (titled "Techniques for a Mixed Audio Conference" and published on Jun. 9, 2016), US 2015/0271020 (titled "Collaborative Conference Experience Improvement" and published on Sep. 24, 2015), US 2015/0078332 (titled "Voice Call Continuity in Hybrid Networks" and published on Mar. 19, 2015), US 2015/0012984 (titled "Participant Authentication and Authorization for Joining a Private Conference Event" and published on Jan. 8, 2015), US 2014/0344366 (titled "Automatic Utilization of Resources in a Realtime Conference" and published on Nov. 20, 2014), US 2012/0275349 (titled "Conference Call Monitoring with Automatic Reconnect" published on Nov. 1, 2012), US 2011/0119389 (titled "Transferring Multiple Communication Modalities During a Conversation" and published on May 19, 2011), US 2010/0223389 (titled "Enabling Trusted Conferencing Services" and published on Sep. 2, 2010), US 2009/0282103 (titled "Techniques to Manage Media Content for a Multimedia Conference Event" and published on Nov. 12, 2009), and US 2008/0226051 (titled "Techniques for Managing a Multimedia Conference Call" and published on Sep. 18, 2008), each of which are incorporated by reference herein in their entireties.

In the example illustrated in FIG. 1, each of the participants 104a, 104b, and 104c is associated with one or more devices 106a, 106b, 106bb, and 106c, which, in the example of FIG. 1, may be referred to as "participant devices" or "user devices." More specifically, first participant 104a is associated with one device 106a, which may also be referred to as a first device; second participant 104b is associated with two devices 106b and 106bb (for example, one device may be a laptop computer and the other a smartphone), which may be referred to as second and third devices; and third participant 104c is associated with one device 106c, which may be referred to as a fourth device. Each participant device may be configured to allow user of one or more telecommunications services, and/or to execute software instructions configured to allow the participant device to interact with processing environment 130, including, for example, providing utterance information to processing environment 130, receiving responses from processing environment 130, and/or presenting the received responses to one or more participants. In some examples, a participant device is a simple POTS ("plain old telephone service") telephone unit or mobile telephone. In some examples, a participant device may be a participant computing device suitable for executing software instructions, which may be included in one or more software applications, configured to allow the participant device to interact with processing environment 130. Examples of participant computing devices include, but are not limited to, a smartphone, a tablet computer, a smart watch, a wearable computer, a personal computer, a desktop computer, a gaming system, a laptop computer, a virtual reality (VR) device, and augmented reality (AR) device, and a mixed reality (MR) device. Such a VR/AR/MR device (with the phrase "VR/AR/MR" referring to the use of one or more of VR, AR, and/or MR) may include a head mounted display (HMD) that provides an immersive virtual experience for a participant wearing and viewing the HMD, such as, but not limited to, the Microsoft HoloLens™ or Oculus Rift™. This list is only an example, and should not be considered as limiting. In some examples, all of the participants 104a, 104b, and 104c could be at a same location and/or in a same room and able to speak directly to each other. In the specific example illustrated in FIG. 1, an utterance 110 presented by the participant 104a (by speech) results in a single response being generated by the processing environment 130, which is presented to participants 104a and 104b, but is not presented to participant 104c.

Network(s) 120 includes one or more data communication networks allowing data to be communicated between various elements of the system 100, such as devices 106a, 106b, and 106c, external information store 122, external services 124, and/or the modules and elements included in processing environment 130. Network(s) 120 may include, for example, the Internet, an internet service provider (ISP) connection, a local wired or wireless network (such as, but not limited to, Wi-Fi or Ethernet), a short range wireless network (such as, but not limited to, Bluetooth), and/or an internal network connecting two or more of the modules and elements included in processing environment 130.

Processing environment 130 is adapted to utilize spoken cues from utterances spoken in session 102 to influence a render state for a virtual assistant (not individually identified in FIG. 1). A virtual assistant may also be referred to as a virtual assistant system, a digital assistant, a digital assistant system, a digital personal assistant, and/or an automated agent. Some or all of the processing environment 130 may be referred to as, included in, and/or include the virtual assistant. For example, in some implementations, processing environment 130 includes a virtual assistant including an interpretation module 136, an action-taking module 146, a response generation module 154, a knowledge access module 160, a virtual assistant information store 162, and a user information store 164. In such implementations, the virtual assistant may include program interfaces allowing other modules of processing environment 130 to interact with, control, and receive information from the virtual assistant.

Various examples of techniques and systems involving virtual assistants, interpretation of spoken utterances, and responding to such utterances are described in U.S. Patent Application Public Numbers US 2017/0140041 (titled "Computer Speech Recognition And Semantic Understanding From Activity Patterns" and published on May 18, 2017), US 2017/0124447 (titled "Identifying Relevant Content Items using a Deep-Structured Neural Network" and published on May 4, 2017), US 2017/0092264 (titled "Detecting Actionable Items in a Conversation among Participants" and published on Mar. 30, 2017), US 2017/0060848 (titled "Distributed Server System for Language Understanding" and published on Mar. 2, 2017), US 2017/0018271 (titled "Delayed Binding in Response Selection During Input Understanding Processing" and published on Jan. 19, 2017), US 2016/0373571 (titled "Use of a Digital Assistant in Communications" and published on Dec. 22, 2016), US 2016/0335138 (titled "Digital Assistant Extensibility to Third Party Applications" and published on Nov. 17, 2016), US 2016/0307567 (titled "Context Carryover in Language Understanding Systems or Methods" and published on Oct. 20, 2016), US 2016/0210363 (titled "Contextual Search Using Natural Language" and published on Jul. 21, 2016), US 2016/0203331 (titled "Protecting Private Information in Input Understanding System" and published on Jul. 14, 2016), US 2016/0196499 (titled "Managing User Interaction for Input Understanding Determinations" and published on Jul. 7, 2016), and US 2016/0171980 (titled "Digital Assistant Voice Input Integration" and published on Jun. 16, 2016), each of which are incorporated by reference herein in their entireties.

Processing environment 130 may correspond to one or more server computing devices, optionally together with other digital processing equipment (for example, routers, load-balancers, etc.). The computing devices associated with the processing environment 130 may be provided at a single location, or may be distributed over plural locations. Although in FIG. 1 various modules and other elements are illustrated as being included in the processing environment 130, it is noted that each of those elements and modules may be included, in whole or in part, in other portions of the system 100. For example, some or all of participants identification module 132, requester recognition module 134, user information store 164, speech recognition module 138, rendering policy evaluation module 170, rendering policy store 172, response rendering module 156, and/or response routing module 158 may be implemented in one or more of devices 106a, 106b, 106bb, and/or 106c. Also, some or all of participants identification module 132, requester recognition module 134, recipient subset(s) selection module 152, and/or response routing module 158 may be implemented in one or more server computing devices different from those used to implement the virtual assistant. In some implementations, processing environment 130 may be implemented by one or more of the devices 106a, 106b, 106bb, and/or 106c, allowing interaction with a virtual assistant provided by the device(s) without requiring data communication with remote computer systems. Processing environment 130 includes a control module 180 which is configured to control and/or coordinate operation of the various modules included in the processing environment 130.

In different implementations, the participants 104a, 104b, and 104c may interact with the processing engine 130 using one or more devices, such as device 106a. In some examples, a telecommunication service used to implement session 102 may include features enabling participants 104a, 104b, and 104c to interact with the processing engine 130 without requiring devices 106a, 106b, 106bb, and/or 106c to implement specific features for interaction with processing engine 130; for example, simple POTS telephones may be used for devices 106a, 106b, and/or 106c.

Participants identification module 132 is configured to identify the participants participating in a spoken conversation session, such as the participants 104a, 104b, and 104c participating in session 102. In some implementations in which the session 102 is provided via a telecommunication service (such as a teleconferencing system), the telecommunication service may be configured to identify to processing environment 130 the participants of the session 102 (for example, such information may be collected by the telecommunication service as part of performing access control and/or identification of participants of session 102). In some examples, some or all of the participants may each be associated with a respective persistent unique identifier such as, but not limited to, a username or a user ID, that is used across multiple conversation sessions. In some examples, a temporary unique identifier may be associated with each participant, and simply used by processing environment 130 to distinguish one participant from another during the spoken conversation session 102. Where participants are simply distinguished but not identified, dummy labels such as "speaker A," "speaker B," etc. may be assigned to the participants. In some implementations, each of the participants 104a, 104b, and 106c may be associated with their respective devices 106a, 106b and 106bb, and 106c, and/or software applications executing thereon, and identified as participants in the spoken conversation session 102 by identifiers assigned to and/or associated with the devices and/or software applications.

In some examples, the participants identification module 134 may provide additional information such as, but not limited to, devices associated with each participant (which may include devices other than those used to send and/or receive spoken conversation), devices associated with the session 102, information about such devices (which may be used, for example, to identify communication modalities available for a device), information about software applications being used and/or available on such devices, names of the participants, names of teams, groups, companies, and/or organizations associated with the participants, and/or contact information for participants (such as, but not limited to, messaging and/or email addresses). In some examples, some of the additional information may be stored in user information store 122 via knowledge access module 160. Such additional information may be used by other modules included in processing environment 130. As an example, the content recognition module 142 may be configured to use participant names to identify one or more participants indicated in an utterance (for example, determining which participant is being referred to when the name "Robert" is used in an utterance). As another example, the rendering policy evaluation module 170 may be configured to use such information to identify devices associated with participants and obtain information about them.

Requester recognition module 134 is configured to identify which one of the participants presented an utterance, such as utterance 110 spoken by participant 104a, that is being processed by the processing environment 130. That identified participant may be referred to as the "requester" for that utterance. In some implementations in which the session 102 is provided via a telecommunications service (such as a conferencing system), the telecommunications service may be configured to identify a participant that is currently speaking, and this information may be used to determine the requester for an utterance. For example, the telecommunications service may provide metadata identifying a current speaker.

Interpretation module 136 is configured to receive and process utterance information, such as utterance information for utterance 110 presented by the participant 104*a*. Furthermore, interpretation module 136 is configured to generate interpretation results for the received utterance information, where the interpretation results reflect underlying meanings associated with the received utterance information. Interpretation results generated by interpretation module 136 for utterance information may include, for example, one or more contexts provided by context module 140, one or more intents identified by intent recognition module 142, and/or one or more contents identified by content recognition module 144. Interpretation module 136 may be configured to generate interpretation results based on the received utterance information, information about the participants in a session provided by participants identification module 132, a requester identity provided by requester recognition module 134, one or more contexts provided by context module 140, and/or information retrieved by knowledge access module 160. In some implementations, the interpretation results are generated using at least one machine-trained model (such as, but not limited to, a model for a deep-structured neural network). The received utterance information may be provided as, for example, an audio signal containing the at least one utterance, recognized speech information, and/or detected utterances.

Speech recognition module 138 is adapted to receive utterance information that expresses at least one utterance presented by one participant of a session, and convert the utterance information to recognized speech information, to provide one or more detected utterances. The received utterance information may be provided as, for example, an audio signal providing a digital representation of sound waves captured by one or more microphones. The speech recognition module 138 may then use at least one machine-trained model (such as, but not limited to, a model for a deep-structured neural network) to convert the utterance information into recognized speech information. The recognized speech information includes one or more detected utterances by one or more participants to the conversation. As mentioned previously, the speech recognition module 132 may be implemented in part by device 106*a*. For example, the device 106*a* may be configured to capture an audio signal for an utterance, and perform an initial conversion of the audio signal into intermediate utterance information providing a more compact encoding of the utterance information. The system 100 may be configured to capture an utterance presented by a participant at a time that the participant is considered to be in a muted state (during which utterances by the participant are not presented to other participants), and use processing environment 130 to process the utterance, thereby allowing the participant to integrate use of the virtual assistant provided by system 100 into their involvement in a session.

In some implementations, interpretation module 138 includes a context module 140 used to create, maintain, and provide one or more contexts for one or more sessions and/or one or more participants. Examples of such contexts include, but are not limited to, context for a session across all participants (for example, if the session is work related or personal and/or includes participants not included in a business or organization), context for a session for individual participants, context for one or more participants across multiple sessions, context for an utterance that is maintained pending obtaining additional information from the requester to process the utterance (for example, issuing a request for additional information and receiving another utterance providing the additional information). Such contexts may be created and/or maintained based on, for example, current utterance information, previous utterance information, information provided by participants identification module 132, an identification of the requester provided by requester recognition module 134, intents recognized by intent recognition module 142, and/or contents recognized by content recognition module 144. By use of such context information, interpretation module 138, including intent recognition module 142 and content recognition module 144, may more effectively identify and/or infer interpretation results, including, for example, an intent and/or content, for an utterance.

In the example illustrated in FIG. 1, the interpretation module 138 includes intent recognition module 142, which is adapted to recognize any intents (which may be referred to as "intent items") for a command or query included in an utterance based on at least the recognized speech information provided by the speech recognition module 138 for the utterance. Such intents may be associated with, for example, verb phrases indicating an action to perform (for example, "send an email," or "make a reservation"), and verb phrases indicating a communication modality (for example, "tell" may be associated with voice, and "show" may be associated with visual presentation). The intent recognition module 142 may use at least one machine-trained model (such as, but not limited to, a model for a deep-structured neural network) to recognize intents based on the recognized speech information. In some cases, an intent may be inferred in part based on information provided by context module 140. In some cases, an intent may be recognized based further on information provided by participants identification module 132 (for example, identifiers or more detailed information for the participants 104*a*, 104*b*, and 104*c*), an identification of the requester provided by requester recognition module 134, one or more contents recognized by content recognition module 144 for the utterance, and/or information obtained via knowledge access module 160 (such as, for example, information obtained from virtual assistant store 162, user information store 164, and/or external information store 122). Such information may be provided as inputs to the machine-trained model and/or used to disambiguate or infer identities of intents for the command or query.

In the example illustrated in FIG. 1, the interpretation module 138 includes content recognition module 144, which is adapted to recognize any contents (which may be referred to as "content items") for a command or query included in an utterance based on at least the recognized speech information provided by the speech recognition module 138 for the utterance. Such contents may be associated with, for example, noun phrases, participants for the session, and individuals not participating in the session. The content recognition module 144 may use at least one machine-trained model (such as, but not limited to, a model for a deep-structured neural network) to recognize intents based on the recognized speech information. In some cases, a content may be recognized based further on information provided by participants identification module 132, requester recognition module 134, one or more intents recognized by intent recognition module 142 for the utterance, and/or information obtained via knowledge access module 160. Such information may be provided as inputs to the machine-trained model and/or used to disambiguate or infer identities of contents for the command or query. For example, for an utterance "what is on my husband's calendar today?", the content recognition module 144 may identify the requester using information from the requester recognition module 134, and then identify the requester's husband using information from the participants identification module 132 and/or the user information store 164.

For some commands or queries, the processing environment 130 may perform, via action-taking module 146, one or more associated computer-implemented actions in addition to providing a response. Any such actions for a command or query in an utterance may be identified by the action-taking module 146 based on at least the interpretation results provided by the interpretation module 138 for the utterance. In some cases, action-taking module 146 may perform an action by accessing one or more of the external services 124. For example, an utterance such as "schedule lunch for me and Rachel next Monday" may result in, among other things, action-taking module 146 accessing an electronic calendar included in the external services 124. In some cases, action-taking module 146 may perform an action by accessing one or more of the devices 106*a*, 106*b*, 106*bb*, and/or 106*c*. For example, contact information might be retrieved from a smartphone device associated with a requester. In some examples, action-taking module 146 performs an action to obtain information for a response and/or perform a command indicated by an utterance. In some cases, the action-taking module 146 automatically performs an action as soon as the action is identified, or some time thereafter (for example, after the close of a meeting). In other cases, the action-taking module 146 only performs an action after receiving confirmation from a participant that the action should be taken, such as by requesting and receiving confirmation from a participant during a session. Example actions include, but are not limited to: finding information, muting or unmuting the session, switching between a listen-only mode and an active participant mode, transferring a call, listening to messages, interacting with a search service, making a purchase, making a reservation, creating a single reminder, creating a recurrent reminder, creating a calendar entry, finding one or more calendar entries, scheduling a meeting, scheduling an alarm, adding a task to a task list, performing a search, finding an email, sending an email message, sending a text message, sending an instant message, recording audio or video, deleting a file, finding a file, adding a file to a particular folder, showing or sharing files, transcribing audio, opening a file in an application, starting an application, retrieving contact information, sharing contact information, making a telephone call, posting a message or file to a social network site, and sending a link to a resource.

Response module 150 is configured to selectively identify one or more recipient subsets, each including one or more of a plurality of participants participating in a spoken conversation session, based on at least interpretation results (such as, for example, an intent and/or content) provided by interpretation module 138 for an utterance; generate responses for each of the identified recipient subsets; routing the generated responses to provide them to their respective recipient subsets; and render the generated responses (which may be performed, individually or in combination) by processing environment 130 and/or device(s) used to present the rendered response(s) to participants. Although the example illustrated in FIG. 1 divides the functions of the response module 150 among four modules 152, 154, 156, and 158, fewer or more modules may be employed to perform the operations of response module 150. For example, the operations of recipient subset(s) selection module 152 and response generation module 154 may be combined into a first module, and the operations of response rendering module 156 and response routing module 158 may be combined into a second module. In some implementations, the response module 150 is further configured to determine response modalities. Examples of operation of the response module 150 are discussed below.

In the example illustrated in FIG. 1, response module 150 includes a recipient subset(s) selection module 152 which is configured to selectively identify one or more recipient subsets, each including one or more of a plurality of participants participating in a spoken conversation session, based on at least interpretation results (such as, for example, an intent and/or content) provided by interpretation module 138 for an utterance. In the example illustrated in FIG. 1, for the utterance 110 presented by the participant 104*a* to device 106*a*, recipient subset(s) selection module 152 has selectively identified a first recipient subset including the participants 104*a* and 104*b*, but not including the participant 104*c*. In this example, or the first recipient subset and during the session 102, a first response is generated by response generation module 154, the first response is rendered by response rendering module 156, and response routing module 158 provides the first response (as a rendered response rendered to synthesized speech audio) to the first recipient subset (as rendered responses 112*a* and 112*b*). Neither the first response nor any other response for the utterance 110 is provided to the participant 104*c* not included in the first recipient subset.

In an alternate example, the first recipient subset is selectively identified and handled as above. Additionally, recipient subset(s) selection module 152 selectively identifies a second recipient subset including only participant 104*c*. For the second recipient subset and during the session 102, a second response is generated by response generation module 154, the second response is rendered by response rendering module 156, and response routing module 158 provides the second response to the second recipient subset (as rendered response 112*c*). Similar examples, and additional examples, of selective identification of recipient subsets by recipient subset(s) selection module 152 are described below.

In some examples, recipient subset(s) selection module 152 selectively identifies one or more of the recipient subsets based further on information provided by participants identification module 132, requester recognition model 134, one or more intents recognized by intent recognition module 142 for the utterance, one or more contents recognized by content recognition module 144 for the utterance, and/or information obtained via knowledge access module 160. In some examples, recipient subset(s) selection module 152 selectively identifies one or more of the recipient subsets based further on one or more responses generated by response generation module 154 for the utterance. In some examples, recipient subset(s) selection module 152 selectively identifies one or more of the recipient subsets based further on operation of the render policy evaluation module 170 is combination with response module 150. For example, recipient subset(s) selection module 152 may selectively identify, remove, and/or modify one or more recipient subsets based on determinations made by the render policy evaluation module 170. In some examples, recipient subset(s) selection module 152 is configured to determine a communication modality for each recipient subset.

In the example illustrated in FIG. 1, response module 150 includes a response generation module 154 which is configured to generate a response for each recipient subset selectively identified by the recipient subset(s) selection module 152. The individual responses are generated, at least initially, much as expected for a virtual assistant. In some cases, response generation module 154 will operate in cooperation with action-taking module 146 to interact with an external resource 124 (such as to collect a particular item of information available through the external service 124). In some cases, the response may be a request for additional information in response to processing environment 130 determining that additional information is needed to process the current utterance information. In such cases, there may be only a single recipient subset consisting of only the requester (or another participant that needs to provide information). However, in an example in which the additional information involves collecting votes from multiple participants, more than one recipient would be identified.

Response generation module 154 may be configured to identify types of information being requested to perform a query for generating a response and/or types of information included in a response. The identified types may be indicated to rendering policy evaluation module 170. For example, certain types of information may be considered sensitive, and a policy may be defined that prevents that information from being included in a response and/or provided to certain participants. If, in the course of generating a response, it is determined that a recipient subset should be removed, added, and/or modified, information for such changes may be provided to recipient subset(s) selection module 152 to effect such changes.

In some implementations, recipient subset(s) selection module 152 and/or response generation module 154 may be configured to determine a communication modality for each of the recipient subsets identified by recipient subset(s) selection module 152 and/or responses generated by response generation module 154. As one example, recipient subset(s) selection module 152 may be configured to determine a communication modality based on information obtained from participants identification module 132, requester recognition module 134, and/or knowledge access module 160 (for example, such information may indicate communication modalities supported by devices and/or preferences indicated by participants). As another example, response generation module 154 may be configured to determine a communication modality based on the previously mentioned types of information being requested to perform a query for generating a response and/or types of information included in a response (for example, after generating a response, response generation module 154 may determine it would be better or more effectively presented using a different communication modality). As another example, policies may be defined that affect a communication modality for responding to an utterance, and recipient subset(s) selection module 152 and/or response generation module 154 may be configured to determine a communication modality based on a determination by render policy evaluation module 170. In some implementations, response generation module 154 may be configured to generate a response based on a determined communication modality for the response (for example, graphical images would be avoided for a synthesized speech response.

In the example illustrated in FIG. 1, response module 150 includes a response rendering module 156 which is configured to render a response generated by response generation module 154 according to a communication modality identified for the response. For example, a response may be encoded as a text string, which may be rendered as, for example, synthesized spoken audio in a first case, and as graphical text in a second case. In some examples, some or all of response rendering module 156 is implemented at a device used to present a response to participant, and the rendering of the response is performed at the device. This may be effective for a participant computing device with sufficient capability and resources to perform the rendering. For a less capable device, such as a standard POTS providing only a voice modality, rendering of a response (in the case of the standard POTS phone, by speech synthesis) may be performed by the processing environment 130 and the rendered response provided to the device for presentation to the target participant.

In the example illustrated in FIG. 1, response module 150 includes a response routing module 158 which is configured to provide one or more responses generated by the response generation module 154 for presentation, after being rendered by response rendering module 156. In some implementations, the responses may be presented to their respective participants by routing the responses to the appropriate devices for presentation in a manner suitable for the communication modality for the response. In some examples, such routing of a response depends on providing the response to a device presently associated with a target participant according to a format and/or protocol expected by the device. In some examples, a telecommunications service providing the session 102 may provide a program interface enabling targeted routing of responses to indicated devices and/or participants, and response routing module 158 may be adapted to use the program interface for this purpose.

Knowledge access module 160 is configured to retrieve information from virtual assistant information store 162, which may be used by, for example, speech recognition module 138, context module 140, intent recognition module 142, content recognition module 144, action-taking module 146, and/or response generation module 154. In some cases, such modules may store information in virtual assistant information store 162 via knowledge access module 160. In some implementations, processing environment 130 may include a user information store 164 and knowledge access module 160 is further configured to retrieve user information from user information store 164, which may be used by, for example, by participants identification module 132, requester recognition module 134, interpretation module 136, action-taking module 146, and/or response module 150. In some cases, such modules may store information in virtual assistant information store 162 via knowledge access module 160. In some cases, knowledge access module 160 may be further configured to retrieve external information from external information store 122, the external information providing, for example, additional information associated with one or more of the participants 104a, 104b, and 104c, a business or organization for one or more of the participants 104a, 104b, and 104c, and/or domain specific information that may be improve handling of utterances by processing environment 130. Such additional information may be similar to the types of information stored in user information store 164 and/or rendering policy store 172. In some cases, processing environment 130 may store information in external information store 122. Although a single external information store 122 is illustrated in FIG. 1, there may be multiple such external information stores accessible to knowledge access module. In some implementations, knowledge access module 160 is further configured, for certain user information, to retrieve user information stored in one or more of the devices 106*a*, 106*b*, 106*bb*, and/or 106*c*.

As illustrated in the example of FIG. 1, in some implementations, processing environment 130 may include rendering policy evaluation module 170 and rendering policy store 172. Rendering policies stored in rendering policy store 172 and applied by rendering policy evaluation module 170 define rules for determining which participants a particular item may be presented to and/or how the item is presented to one or more participants. Examples of determinations made by applying rendering policies include, but are not limited to, determining a particular response should not be provided to a participant, determining a portion of a response containing sensitive information should not be provided to a participant, and/or determining a communication modality for a response. Such determinations may affect operation of processing environment 130 and/or devices such as devices 106*a*, 106*b*, 106*bb*, and/or 106*c*. Any aspect or state of a device (for example, device type, capability, and/or owner), participant, session, organization, facility, location, information store, and/or module (for example, a context provided by context module 140 or an interpretation result provided by interpretation module 136) that can be provided to rendering policy evaluation module 170 may be specified as a condition for a rendering policy. A number of specific examples will be described below. As illustrated by the examples in this disclosure, the rendering policy evaluation module 170 may be invoked at various stages of processing of an utterance by system 100. In some examples, some or all of rendering policy evaluation module 170 and rendering policy store 172 may be implemented in a device, and the device may provide and/or implement policies. It is noted that various operations and determinations described in connection with rendering policies in this disclosure may alternatively be implemented as program instructions in processing environment 130.

Some rendering policies may be designated or identified as "default" policies that may be overridden by another rendering policy (such as, but not limited to, a participant or device level rendering policy) and/or an explicit indication in an utterance. For example, a default rendering policy may specify that spouse-related information should not be presented to other participants in a work-related session, but it may be overridden by an utterance such as "tell us my husband's schedule for today," as the word "us" explicitly indicates the response should be directed to additional participants. Some rendering policies may be designated or identified as "mandatory" policies that may not be overridden in the same manner as described above for default policies. For example, one or more rendering policies may be defined to enforce compartmentalization of sensitive information. A priority level and/or an order may be associated with a rendering policy to control which, among multiple applicable rendering policies, are applied. In some examples, rendering policies may be arranged and applied according to one or more hierarchies. For example, a mandatory corporate rendering policy may not be overridden by a participant-created rendering policy. In some examples, processing environment 130 may, according to a rendering policy, request confirmation from a requester before providing a response to one or more other participants.

In the embodiments that follow in FIGS. 2-9, the reader may understand that the various features, properties, characteristics, configurations, and/or arrangements as described above with reference to FIG. 1 may be equally applicable to the following embodiments. Thus, for example, although a device or system included therein may not be specifically described below as including a feature, property, characteristic, configuration and/or arrangement, it may be appreciated that the details provided above with respect to FIG. 1 may be incorporated in any of the following embodiments of FIGS. 2-9.

Figure 2:
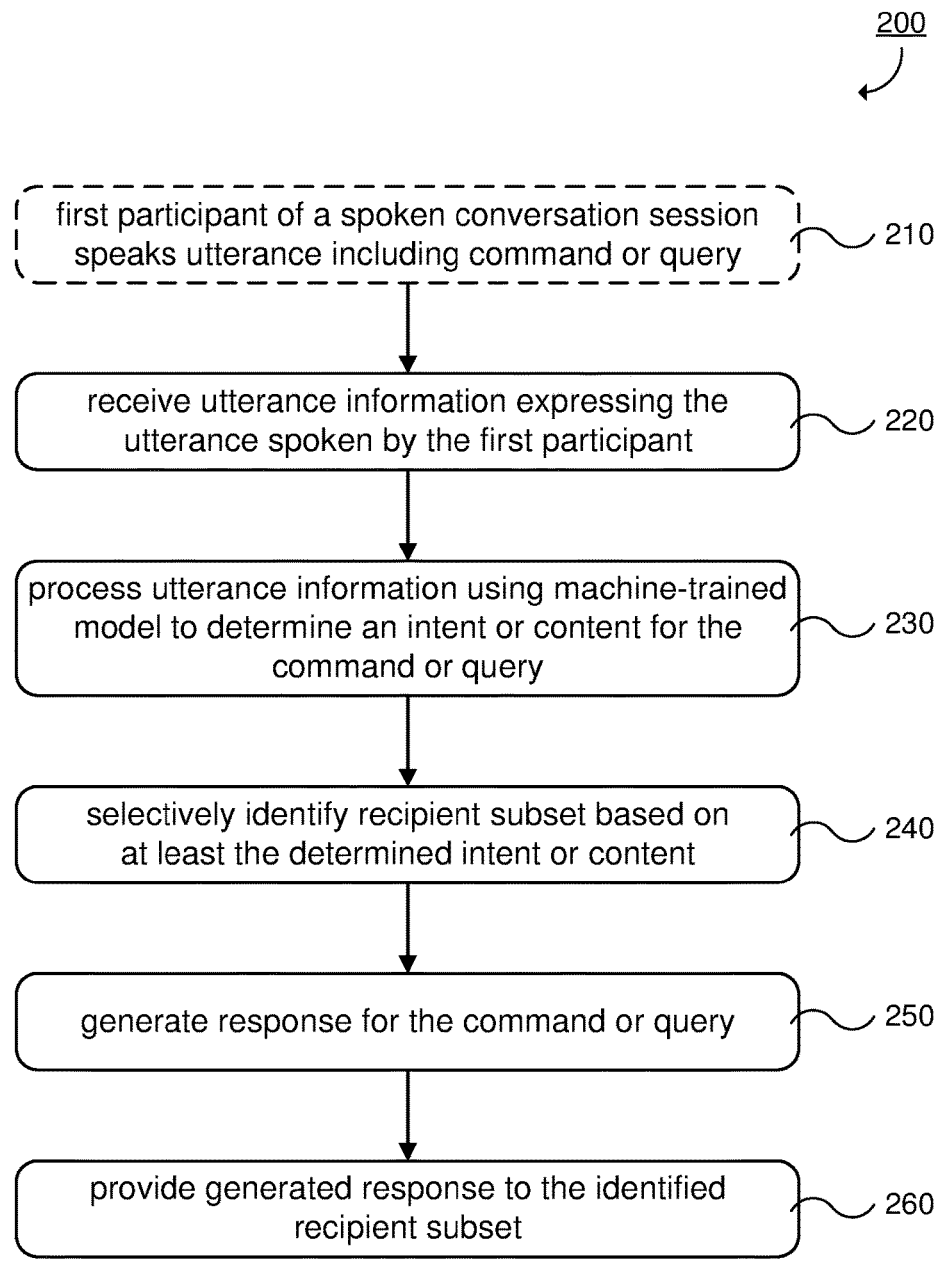
FIG. 2 illustrates examples of methods and/or processes for integrating a virtual assistant into a spoken conversation session.

FIG. 2 illustrates examples of methods and/or processes for integrating a virtual assistant into a spoken conversation session. The methods and/or processes illustrated in FIG. 2 may be implemented using the various devices, systems, elements, operations, and features described above in connection with FIG. 1. At an optional step 210, a first participant included in a plurality of participants of a spoken conversation session speaks an utterance containing a command or query for a virtual assistant. For example, FIG. 1 illustrates an example in which participant 104*a* presents an utterance 110 (by speaking the utterance 110) including a command or query. Step 220 includes receiving utterance information expressing the utterance spoken by the first participant at step 210. With reference to the above-noted example in FIG. 1, the utterance 110 is captured by device 106*a*, which converts the sound waves for the utterance 110 into utterance information expressing the utterance 110. Then, processing environment 130 receives the utterance information from the device 106*a*.

Step 230 includes processing the utterance information received at step 220 using a machine-trained model to determine an intent or content for the command or query. With reference to the above-noted example in FIG. 1, the utterance information received from device 106*a* for the utterance 110 is processed by interpretation module 136, including processing by intent recognition module 142 and content recognition module 144, to determine an intent or content for the command or query included in the utterance 110.

Step 240 includes selectively identifying a recipient subset of one or more of the plurality of participants discussed in connection with step 210, based on at least the intent or content determined at step 230. With reference to the above-noted example in FIG. 1, recipient subset(s) selection module 152 identifies, for the utterance 110, a first recipient subset that includes participants 104*a* and 104*b*, but does not include participant 104*c*.

Step 250 includes generating a response for the command or query included in the utterance spoken at step 210. With reference to the above-noted example in FIG. 1, the response generation module 154 generates a first response for the command or query included in utterance 110. Step 260 includes providing the generated response to the identified recipient subset. With reference to the above-noted example in FIG. 1, the first response generated by the response generation module 154 is provided to the first recipient subset (participants 104*a* and 104*b*) by routing the first response to each of the devices 106*a* and 106*b*. The various techniques described below in connection with FIGS. 3-9 may be used in conjunction with the steps illustrated in FIG. 2, and aspects of the techniques described in connection with FIGS. 3-9 may be implemented using techniques described in connection with FIGS. 1 and 2.

Figure 3:
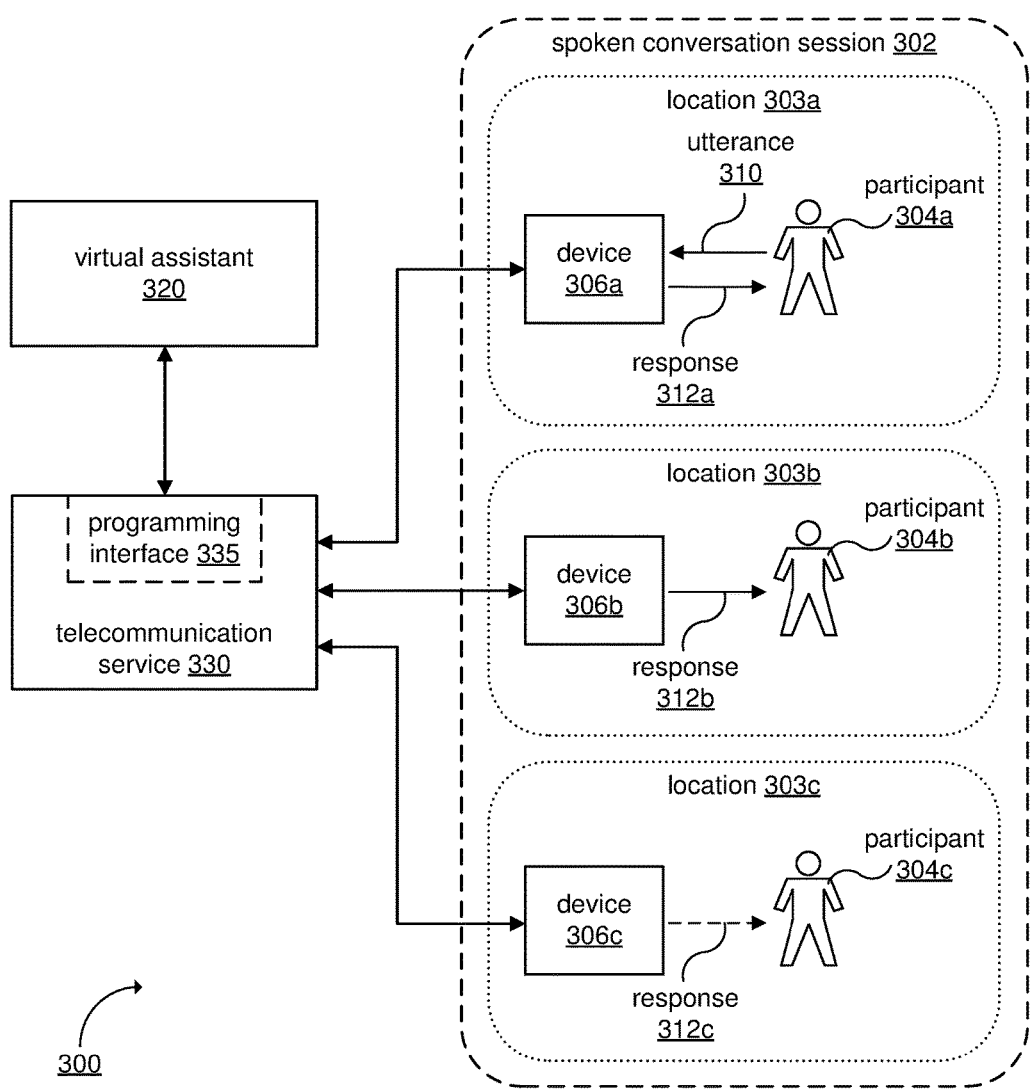
FIG. 3 illustrates a schematic example of a system including a telecommunication service integrating a virtual assistant into a spoken conversation session provided by the telecommunication service.

FIG. 3 illustrates a schematic example of a system 300 including a telecommunication service 330 integrating a virtual assistant 320 into a spoken conversation session 302 provided by the telecommunication service 330. The telecommunication service 330 may be implemented and operated as described in connection with FIG. 1. In some implementations, the telecommunication service 330 may be implemented using a "cloud" system architecture. In some examples, the telecommunication service 330 may be a VoIP (Voice over IP) based conferencing system. In the example illustrated in FIG. 3, there are three participants 304a, 304b, and 304c participating in the spoken conversation session 302, much as described for participants 104a, 104b, and 104c participating in the session 102 illustrated in FIG. 1. The first participant 304a is at a first location 303a, the second participant 304b is at a second location 303b, and the third participant 304c is at a third location 303c. The locations 303a, 303b, and 303c are different locations from each other, and participants 304a, 304b, and 304c are unable to speak in person with each other directly as a result of being in the different respective locations 303a, 303b, and 303c. Although three participants 304a, 304b, and 304c are illustrated in FIG. 3, the session 302 may have two or more participants.

The first participant 304a is participating in the session 302 via a first participant device 306a, which may be associated with the participant 304a. The second participant 304b is participating in the session 302 via a second participant device 306b, which may be associated with the participant 304b. The third participant 304c is participating in the session 302 via a participant device 306c, which may be associated with the participant 304c. The devices 306a, 306b, and 306c may be configured and used as described for devices 106a, 106b, and 106c illustrated in FIG. 1. In the example illustrated in FIG. 3, during a first period of time when none of the participants 304a, 304b, and 304c are interacting with the virtual assistant 320, they are able to hear each other speak. For example, during the first period of time, when any one of the participants 304a, 304b, and 304c (for example, first participant 304a) speaks, a corresponding first audio is received by a respective one of devices 306a, 306b, and 306c (for example, using a microphone included in the first device 306a), and the first audio is presented to the other participants of the session 302 (for example, second and third participants 304b and 304c) by reproducing the first audio on each of their respective devices (for example, second and third devices 306b and 306c). Accordingly, the session 302 allows real-time conversation between and/or among the participants of the session 302. Other spoken conversation sessions in this disclosure, such as the session 102 illustrated in FIG. 1, may likewise be configured to provide real-time spoken conversation sessions.

The virtual assistant 320 may include the modules and elements illustrated in FIG. 1, and may access other systems, such as the external information store 122 and external services 124, much as described for FIG. 1, although such systems are not illustrated in FIG. 3. As discussed in connection with FIG. 1, some of those modules and elements may be implemented, in whole or in part, by other portions of the system 300. The virtual assistant 320 is configured to interact with the participants via the telecommunication service 330. For example, the telecommunication service 330 may implement a programming interface 335 providing, for example, session information, session participant information, identification of a currently speaking participant, audio from a currently speaking participant, and/or one or more interfaces for selectively routing responses (such as, but not limited to, synthesized speech audio) to devices used to participate in a session. The virtual assistant 320 may be configured to use the programming interface 335 to obtain information used by participants identification module 132, requester recognition module 134, and/or interpretation module 136, and receive capabilities via the telecommunication service 330 used by response module 150. A benefit of this configuration is that this session 302, as well as other sessions provided by the telecommunication service 330, provides a "built in" virtual assistant integration without requiring devices used by participants to participate in the sessions to include any specialized features. For example, even if each of the devices 306a, 306b, and 306c are standard POTS telephones limited to a voice communication modality, integration of virtual assistant 320 is still available. Additionally, the virtual assistant 320 may be configured to identify additional capabilities offered by any of the devices (for example, a smartphone or personal computer) and make additional features available to the more capable devices.

In view of this disclosure and with reference to the features illustrated in FIG. 3, various dialogue examples will be described which illustrate integration of virtual assistant 320 with session 302, including interactions between and among session participants via the virtual assistant 320. It is understood that the various aspects and alternatives described for these dialogue examples may be used in combination with any other examples or embodiments described herein.

In a first dialogue example (which will describe various aspects of processing by the virtual assistant 320 in more detail than in subsequent dialogue examples), during the session 302 among the participants 304a, 304b, and 304c, the first participant 304a speaks an utterance 310 that includes "Hey Cortana, what is the time?" The utterance 310 and/or utterance information for utterance 310 is received by the virtual assistant 320, such as via the programming interface 435 and/or an audio stream for session 302 (including a separate audio stream for the first device 306a or a mixed audio stream for all participants of the session 302 provided by the telecommunication service 330).

Continuing the first dialogue example of the preceding paragraph, utterance 310 includes a trigger phrase (which, in some cases may be a single word, such as "Cortana") at the beginning of the utterance 310 that indicates that the utterance 310 includes a command or query directed to the virtual assistant 320. In some implementations, the trigger phrase ("Hey Cortana") and the remainder of the utterance 310 ("what is the time?") may be handled by the virtual assistant 320 as two utterances. In response to the trigger phrase, the virtual assistant 320 is configured to initiate processing of the command or query included in the remaining portion of utterance 310. In some implementations, such processing may be initiated without use of a trigger phrase. In some implementations, a participant can press a hardware button or activate a software UI (user interface) element to identify when the user is presenting a spoken utterance including a command or query. In some implementations, the virtual assistant 320 may be configured to process all of a participant's utterances and automatically identify commands or queries as being directed to the virtual assistant 320 (for example, certain types of commands or queries may be presumed to be directed to the virtual assistant 320 (for example, "read the subject lines of my unread emails"). In some implementations, the virtual assistant 320 may enter an interactive mode for a participant in which it automatically processes utterances until an event such as, but not limited to, a command to exit the interactive mode, a determination that an utterance was not directed to the virtual assistant 320, and/or an amount of time since a last utterance is greater than a threshold amount of time.

Continuing the first dialogue example of the preceding two paragraphs, in processing the utterance 310, the virtual assistant 320 determines, using interpretation module 136, an interpretation result (which may include an intent or content) for the utterance 310; selectively identifies, using recipient(s) selection module 152 and based on the interpretation result (for example, based on an intent or content), a first recipient subset that includes all three participants 304a, 304b, and/or 304c; generates, using response generation module 154, a first response for the utterance 310 (or, more specifically, the command or query included in the utterance 310) that includes the text "the time is 9:20 A.M."; renders the text of the first response as synthesized speech audio using response rendering module 156; provides the first response to the first recipient subset by using response routing module 158 to route the rendered first response to devices 306a, 306b, and 306c; and presents the rendered first response to each of participants 304a, 304b, and/or 304c by reproducing the rendered first response using devices 306a, 306b, and 306c. In some implementations, the virtual assistant 320 is configured to delay presenting an audio response until a pause or break in spoken conversation in the session 302, to avoid interrupting discussion among the participants of the session 302.

Continuing the first dialogue example of the three preceding paragraphs, in some cases, the first response may have been directed to all of the participants in response to a rendering policy specifying that a current time of day, or non-personal and non-private information, is provided to all participants unless an utterance indicates otherwise. In an alternative example, the first response may instead be directed to only the requester in response to a rendering policy specifying that where the recipients are unspecified or ambiguous, a response is directed only to the requester. In some examples, a rendering policy may be defined that automatically directs certain types of information only to a requester, such as personal or private information. Each of the rendering policies discussed in this paragraph may be overridden verbally by a requester explicitly specifying the recipients.

In a second dialogue example, the utterance 310 instead is "Hey Cortana, tell me the time." In response, the virtual assistant 320 provides a synthesized speech audio response stating "The time is 9:20 A.M." that is only presented to the first participant 304a, as a result of the utterance 310 including the explicit target indicator "me." The second and third participants only hear silence from the first participant 304a while the response is presented to the first participant 304a. In an alternative example, while the response is presented to the first participant 304a, a message is presented to the second participant 304b and/or the third participant 304c stating that the first participant 304a is interacting with the virtual assistant 320. For example, the message may be rendered as synthesized speech audio. In an example in which the session 302 includes video conferencing or the second participant 304b and the third participant 304c have displays, this message may be rendered visually, instead of or in addition to presenting the message as synthesized speech audio. In another alternative example, the virtual assistant 320 may be configured to buffer audio containing one or more utterances by the second participant 304b and/or the third participant 304c while the response is presented to the first participant 304a, and then plays back the buffered audio, or a non-silent portion of the buffered audio, to the first participant 304a after the response is presented to the first participant 304a. In some implementations, the buffered audio may be reproduced at faster than real time, allowing the first participant 304a to catch up more quickly on the conversation that has been occurring in the session 302.

In a third dialogue example, the utterance 310 instead is "Hey Cortana, tell us the time." In response, the virtual assistant 320 provides a synthesized speech audio response stating "The time is 9:20 A.M." that is presented to all of the participants 304a, 304b, and 304c, much as in the first dialogue example, as a result of the utterance 310 including the explicit target indicator "us." In some implementations, an additional audio communication channel, in additional to one or more audio communication channels for conferencing with the other participants, may be established with a recipient to deliver the response. A rendering policy may be defined for the second participant 304b that disables receiving audio from other invocations of virtual assistants, resulting in the response not being delivered to the second participant 304b. A rendering policy may be defined for the second participant 304b that indicates that audio from other invocations of virtual assistants is to be shown visually on a display, resulting in the response being rendered visually for the second participant 304b instead of being rendered as synthesized speech audio.

In a fourth dialogue example, the utterance 310 instead is "Hey Cortana, tell me and Bob the time," where the first name of the second participant 304b is "Bob." The first name of the second participant 304b may be indicated, for example, information provided by participants information module 132, context module 140, user information store 164, and/or external information store 122. In response, the virtual assistant 320 provides a synthesized speech audio response stating "The time is 9:20 A.M." that is presented to the first and second participants 304a and 304b, but is not presented to the third participant 304c, as a result of the utterance 310 including the explicit target indicator "me and Bob." In an alternative example, participants may be identified by a characteristic. For example, if the utterance 310 is instead "Hey Cortana, tell me and the sales team the time," the virtual assistant 320 may selectively identify participants based on information provided by participants information module 132, context module 140, user information store 164, external information store 122 and/or one or more of external services 124 (for example, a Lightweight Directory Access Protocol (LDAP) server) indicating that they are members of the sales team. For example, this may be determined from a hierarchical organization chart stored in external information store 122.

In a fifth dialogue example, the utterance 310 is "Hey Cortana, tell us the time," and the virtual assistant 320 does not allow audio for the utterance 310 to be presented to the second and third participants 304b and 304c. In some examples, the second and third participants 304b and 304c might hear the first participant 304a say the trigger phrase "Hey Cortana," followed by silence corresponding to the time for the remainder of the utterance 310. Thus, although the virtual assistant 320 allows a first audio for another utterance spoken by the first participant 302a before the utterance 310 to be presented to the other participants 302b and 302c (for example, by allowing the telecommunication 320 to normally relay the first audio from one participant to the others), the virtual assistant 320 determines (for example, according to a rendering policy) not to present the second audio to the other participants 302b and 302c. This allows other participants to be aware that a requester is interacting with the virtual assistant 320. In some implementations of such examples, there may be a time delay between a requester uttering a phrase and the phrase being provided to other participants, in order to allow the virtual assistant 320 to process and identify utterances containing trigger phrases and/or commands and queries. In some examples, while a requester is interacting with virtual assistant 320 (for example, a period including the requester uttering a command or query and the virtual assistant 320 providing a response), rather than providing one or more other participants silence, the virtual assistant 320 may provide an indication that the requester is interacting with the virtual assistant 320. For example, a synthesized speech audio and/or a visual indication (for example, where video conference is being used, or a participant has a visual interface available). In some examples, the virtual assistant 320 is configured to selectively screen presenting command or query and/or response content to participants by determining, such as based on one or more rendering policies, whether to present audio or other renderings to the participants. In some examples, blocking of a command or query may be performed at a requester's device and/or participant devices. In some examples, blocking of a command or query may be performed, in part, by virtual assistant 320 providing instructions to mute audio, present different audio (for example, silence or a spoken indication the requester is interacting with the virtual assistant 320), and/or establish a secondary communication channel.

In a sixth dialogue example, the utterance 310 is "Hey Cortana, show us the time," which results in a response such as "The time is 9:20 A.M." being visually presented (as a result of the utterance 310 including the verb "show") to all of the participants 304a, 304b, and 304c. In some examples, the virtual assistant 320 may determine a participant device supports visual responses, and use that device to display the response to the associated participant. In some examples, the virtual assistant 320 may identify a device at a location for a participant, and use that device to display the response to one or more participants at that location. In some cases, the virtual assistant 320 may not be able to identify a mechanism to present a visually rendered response to a participant (for example, the device 306b for the second participant 304b may not include a display, or may not have suitable software installed or running for receiving a visual response from the virtual assistant 320. Where the virtual assistant 320 is unable to present a response to a participant using a selected modality, in some cases the virtual assistant 320 may inform the participant verbally that it could not present the response and, in some examples, verbally offer information to the participant for establishing a mechanism for receiving such responses. In response to a participant accepting such an offer, such information may be provided by spoken audio, email, electronic message, or other mechanism. In some examples, a participant may have multiple associated devices (for example, FIG. 1 illustrates a participant 104b associated with the two devices 106b and 106bb), and a rendering policy may be used to determine one or more or those associated devices via which the response is presented. It is noted that in some examples, virtual assistant 320 may infer that one or more devices are associated with a particular participant, based on interactions within the session 302 and/or previous sessions.

In a seventh dialog example, the first participant 304a is an upper vice president for a company and the utterance 310 is "Hey Cortana, tell us the latest sales numbers." There may be one or more rendering policies that identify and/or exclude participants from hearing or otherwise being presented the utterance 310 and/or its response. For example, a rendering policy may be defined to not allow either commands or queries uttered by vice presidents of the company and/or responses thereto related to business to be presented to other participants that are not vice presidents or higher in the company. This may be effective in controlling the distribution of business sensitive information. In some examples, the requester may receive a fully detailed response, and one or more participants may be selectively identified that receive a limited and/or less detailed response. The participants and/or portions of the response to be included and/or excluded may be determined according to one or more rendering policies. For example, a portion of the fully detailed response may be identified according to a rendering policy as not being suitable for presentation to one or more recipients, and, while a portion of the original fully detailed response may be included in a more limited response, the portion identified according to the rendering policy is omitted from the more limited response. A result of applying various such rendering policies, in response to a command or query, may include, for example, a first recipient group (for example, executives in a company) receiving a fully detailed response, a second recipient group (for example, other employees of the company) receiving a less detailed response, and a third recipient group (for example, people outside of the company) not receiving any substance of the response (for example, silence or a message indicating use of the virtual assistant 320).

Figure 4:
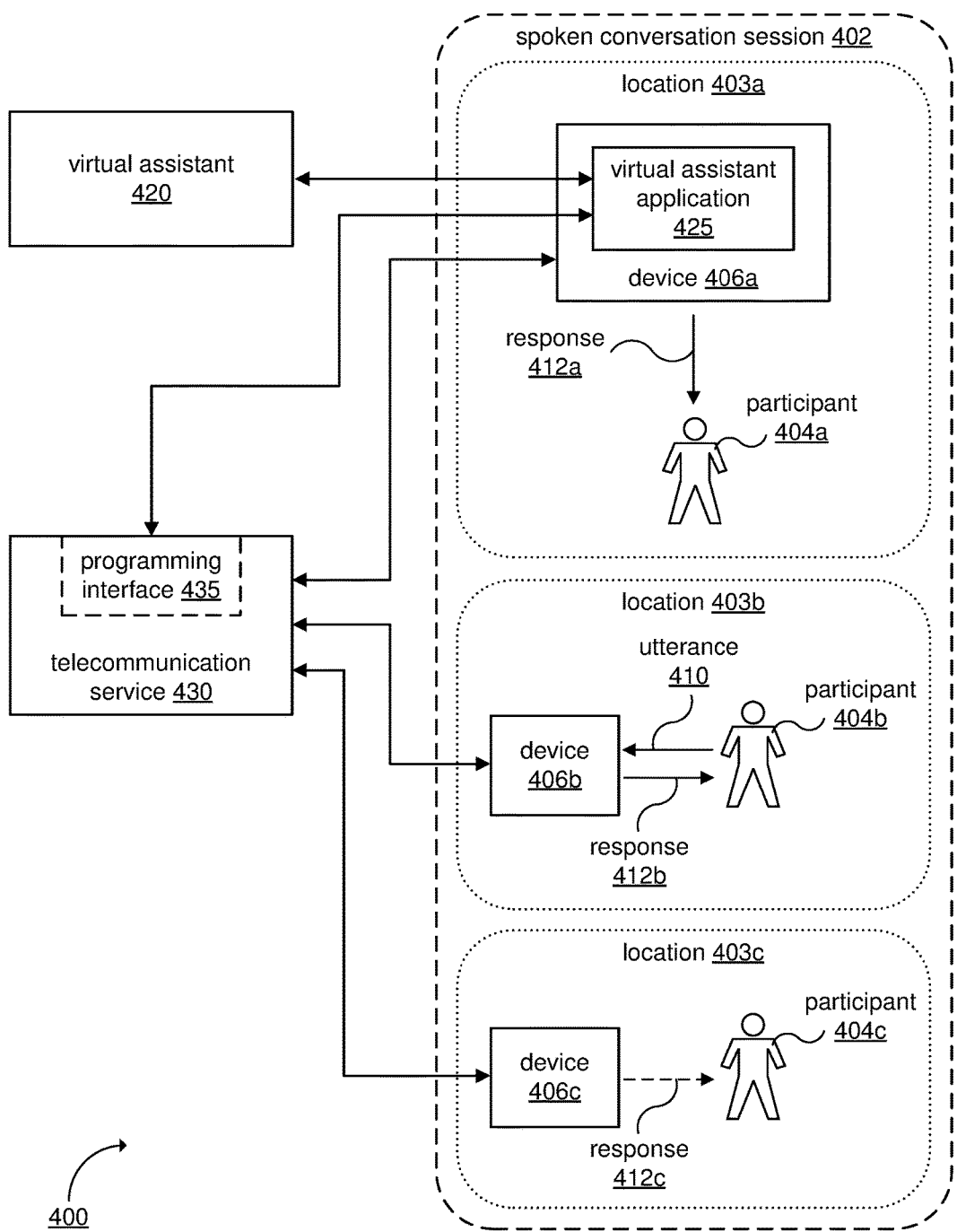
FIG. 4 illustrates a schematic example of a system in which a virtual assistant is integrated into a spoken conversation session provided by a telecommunication service, where the integration occurs via a virtual assistant application executing on a first device that is associated with a first participant.

FIG. 4 illustrates a schematic example of a system 400 in which a virtual assistant 420 is integrated into a spoken conversation session 402 provided by a telecommunication service 430, where the integration occurs via a virtual assistant application 425 executing on a first device 406a that is associated with a first participant 404a. The telecommunication service 430 may be implemented an operated as described in connection with FIG. 1, and/or may be implemented to include various features described above for the telecommunication service 330 illustrated in FIG. 3. In the example illustrated in FIG. 4, there are three participants 404a, 404b, and 404c participating in the spoken conversation session 402, much as described for participants 104a, 104b, and 104c participating in the session 102 illustrated in FIG. 1, and/or for participants 304a, 304b, and 304c participating in the session 302 illustrated in FIG. 3. The first participant 404a is at a first location 403a, the second participant 404b is at a second location 403b, and the third participant 404c is at a third location 403c. The locations 403a, 403b, and 403c are different locations from each other, and participants 404a, 404b, and 404c are unable to speak in person with each other directly as a result of being in the different respective locations 403a, 403b, and 403c. The three participants 404a, 404b, and 404c are participating in the session 402 via respective participant devices 406a, 406b, and 406c so as to provide a real-time spoken conversation session, much as in the session 302 illustrated in FIG. 3. Although three participants 404a, 404b, and 404c are illustrated in FIG. 4, the session 402 may have two or more participants. The virtual assistant 420 may include the modules and elements illustrated in FIG. 1, and may access other systems, such as the external information store 122 and external services 124, much as described for FIG. 1, although such systems are not illustrated in FIG. 4. The virtual assistant 420 may be configured to perform any of the various operations described for the virtual assistant 320 illustrated in FIG. 3.

In the example illustrated in FIG. 4, rather than interacting with the participants 404a, 404b, and 404c via the telecommunication service 430 providing the session 402, the first device 406a is executing a virtual assistant application 425 that is configured to provide access to the virtual assistant 420. For example, the virtual assistant application 420 may be configured to, even outside of spoken conversation sessions, provide the first participant 404a with access to the virtual assistant 420 for processing commands or queries at other times and places. The virtual assistant application 425 is further configured to interact with the telecommunication service 430 and/or the other devices 412b and/or 412c to allow virtual assistant 420 to be integrated into the session 402, much as previously described. In some implementations, to provide integration of the virtual assistant 420 with the session 402, the virtual assistant application 425 may be configured to make use of a programming interface 435 provided by telecommunication service 430 much like the programming interface 335 illustrated in FIG. 3. The virtual assistant application 425 may be configured to use the programming interface 435 obtain information for use by participants identification module 132, requester recognition module 134, and/or interpretation module 136, and receive capabilities via the telecommunication service 330 used by response module 150, whether such modules are implemented by the virtual assistant 420 and/or virtual assistant application 425. In some examples, portions of such modules may be implemented in part by the virtual assistant application 425. In some examples, information obtained by the virtual assistant application 425 by be provided to the virtual assistant 420 for use in processing of utterances by the virtual assistant 420. In some examples, the virtual assistant application 425 may be configured to establish communication channels with one or more other devices used to participate in session 402 and/or associated with participants of session 402 via other avenues than telecommunication service 430; for example, via network(s) 120 illustrated in FIG. 1.

Through use of the first device 406a and the virtual assistant application 425 executing thereon, the first participant 404a may bring integration of the virtual assistant 420 into the session 402 that otherwise would not be available in the session 402. For example, as discussed below, it may allow the second participant 404b to make use of the virtual assistant 420 despite neither the session 402 itself nor the second device 406b offering such capabilities. In one example, the device 406a may be a participant computing device (such as, but not limited to, a smartphone, laptop computer, or VR/AR/MR device including an HMD) and the devices 406b and 406c may be simple POTS telephone devices. Where one or more of the devices 406b and 406c support additional capabilities, such as presenting other modalities in addition to audio, the virtual assistant application 425 may be configured to determine the availability of such capabilities and interact (for example, via network 120) with such devices to make use of the additional capabilities.

In view of this disclosure and with reference to the features illustrated in FIG. 4, various dialogue examples will be described which illustrate integration of virtual assistant 420 with session 402, including interactions between and among session participants and the virtual assistant 420 via the virtual assistant application 425. It is understood that the various aspects and alternatives described for these dialogue examples may be used in combination with any other examples or embodiments described herein, such as, but not limited to, the dialogue examples and alternatives described in connection with FIG. 3.

In an eighth dialogue example, an utterance 410 presented by the second participant 404b and captured by the second device 406b is "Hey Cortana, what is the time?" The utterance 410 is received by the virtual assistant application 425, such as via the programming interface 435 and/or an audio stream for session 402 (including a separate audio stream for the second device 406a or a mixed audio stream for all participants of the session 402 provided by the telecommunication service 430). The virtual assistant 420, in combination with the virtual assistant application 425, processes the utterance 410 as described in previous examples, to determine a response and selectively identify a recipient subset from among the participants of the session 402. In this dialogue example, the virtual assistant application 425 provides a synthesized speech audio response stating "The time is 9:20 A.M." that is only presented to the second participant 404b. As a result, even the first participant 404a associated with the device 406a executing the virtual assistant application 425 is not presented with the response, and may even be unaware of the interaction between the second participant 404b and the virtual assistant 420. Much as discussed for the first dialogue example in the discussion of FIG. 3, the response may have been directed to only the requester (the second participant 404b) in response to a rendering policy specifying that where recipients are unspecified or ambiguous in a command or query, a response is directed only to the requester; or it may have been in response to rendering policy that automatically directs certain types of information only to a requester, such as personal or private information.

Continuing the eighth dialogue example in the previous paragraph, in some examples, the utterance 410 may be blocked from being presented to participants, much as described for the fifth and seventh dialogue examples in the discussion of FIG. 3. However, in some examples, a rendering policy (such as a rendering policy set by the first participant 404a) may be defined that prevents the response from being muted for the first participant 404a. This rendering policy may be configured such that even an explicit indication in the utterance 410 that the response is to be presented only to the requester (for example, "Hey Cortana, tell me the time") will not override this rendering policy. As a result of this rendering policy, the virtual assistant application 425 provides the response to both the first and second participants 404a and 404b. In some configurations, the virtual assistant application 425 may present a notice to the requester of this behavior; for example, the requester may be notified that interactions with the virtual assistant 420 are not private. Such a rendering policy allows the first participant 404a to have an awareness of how the virtual assistant 420 that has been integrated into the session 402 is being used by the other participants.

Continuing the eighth dialogue example in the previous two paragraphs, in some examples, a rendering policy (such as a rendering policy set by the first participant 404a) may be defined that indicates that the virtual assistant application 425 will not process utterances presented by participants other than the first participant 406a, will not process utterances not presented directly to the device 406a executing the virtual assistant application 425, will not respond to commands or queries presented by participants other than the first participant 406a, and/or will not respond to commands or queries not presented directly to the device 406a executing the virtual assistant application 425. For example, although the second participant 404b presents the utterance 410 "Hey Cortana, what is the time?", the virtual assistant application 425 does not process the utterance 410 or provide a corresponding response. In some implementations, even with such a rendering policy, the virtual assistant 420 may process utterances by other participants to develop context information. It is noted that although the rendering policy results in the virtual assistant application 425 not accepting commands or queries from participants other than the first participant 404a, various features and benefits of having the virtual assistant 420 integrated into the session 402 can continue to apply. For example, the first participant 404a may present an utterance "Hey Cortana, tell me and Bob the time," and in response the virtual assistant program 425 provides a synthesized speech response to the first and second participants 404a and 404b, much as described for the fourth dialogue examples in the discussion of FIG. 3

In a variation of the rendering policy discussed in the previous paragraph, a rendering policy may be defined that limits an available scope of commands or queries presented by participants other than the first participant 406a that will be processed by the virtual assistant. For example, the virtual assistant application 425 could not process a command or query from the second participant 404b for an application program to be started or a calendar item to be created in response to such a rendering policy. Such limits may positively define available commands or queries (specifying specific allowed commands or queries or types of commands or queries) and/or negatively define available commands or queries (specifying specific disallowed commands or queries or types of commands or queries). The rendering policy may also be defined to selectively identify participants to which it applies based on one or more characteristics of participants. For example, different limits may be defined for employees versus non-employees.

Figure 5:
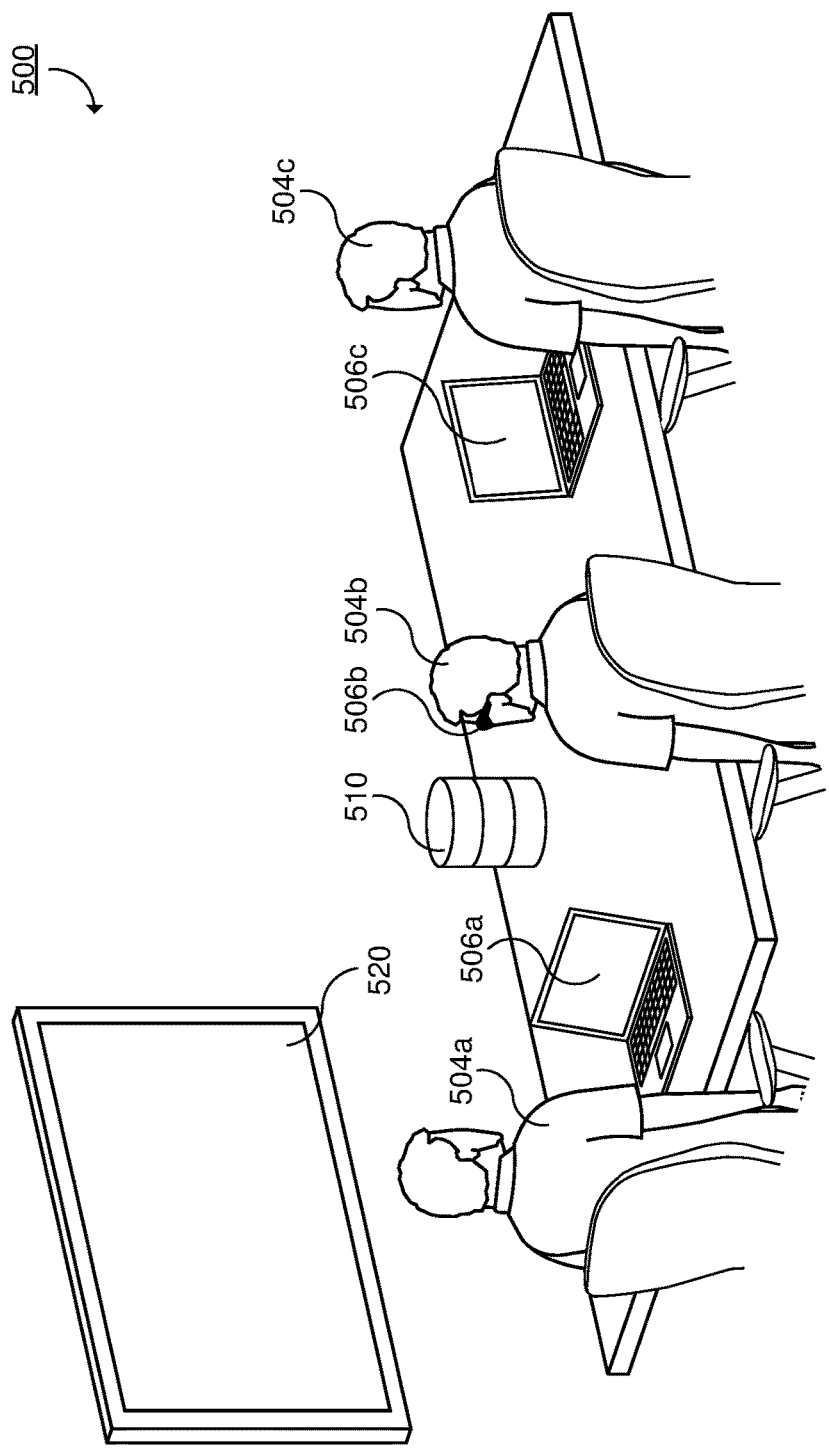
FIG. 5 illustrates an example spoken conversation session in which multiple participants are together in a single location in which they can speak directly to one another and interact with a virtual assistant via a virtual assistant interface device.

FIG. 5 illustrates an example spoken conversation session 500 in which multiple participants 504a, 504b, and 504c are together in a single location (for example, a conference room) in which they can speak directly to one another and interact with a virtual assistant via a virtual assistant interface device 510. Integration of the virtual assistant used in the example of FIG. 5 with the spoken conversation session 500 may be performed according to the various examples described above in connection with FIGS. 1-4, and the various techniques described for FIG. 5 may be applied to the examples throughout this disclosure. In some examples, the spoken conversation session 500 may include participants and devices at other locations, much as previously described. In this example, the first participant 504a is associated with a first participant computing device 506a embodied as a laptop computer, the second participant 504b is associated with a second participant computing device 506a embodied as an VR/AR/MR device including an HMD, and the third participant 504c is associated with a third participant computing device 506c embodied as a laptop computer. Although the devices 506a, 506b, and 506c are not needed to present commands or queries to the virtual assistant, as that is done via virtual assistant interface device 510, they may be used to selectively present responses for those commands or queries to the participants 504a, 504b, and 504c, as discussed in more detail below. Each of the devices 506a, 506b, and 506c may support presenting different modalities for responses, and/or different hardware resources for presenting responses. For example, the HMD device 506b may display visual responses using a see-through HMD, and may privately present audio to the second participant 504b. Each of the devices 506a, 506b, and 506c may be executing respective software programs for interacting with the virtual assistant, including receiving and presenting responses.

In the example illustrated in FIG. 5, the virtual assistant interface device 510 includes one or more microphones for capturing utterances spoken by any of the participants 504a, 504b, and 504c, and includes a speaker used to output audio for synthesized speech responses provided by the virtual assistant, although when such audio responses are presented via the virtual assistant interface device 510, they are heard by all of the participants 504a, 504b, and 504c at the location 500. In some implementations, the virtual assistant interface device 510 and/or its associated virtual assistant may be configured to distinguish and/or identify which of the participants 504a, 504b, and 504c spoke a particular utterance. In some examples, the three participants may merely be distinguished from each other as separate participants without the respective identities of one or more of the participants. Various techniques may be employed to attempt to distinguish and/or identify participants when they speak. In some examples, speaking participants may be identified, by requester recognition module 134 and/or the shared virtual assistant interface device 510, by referring to pre-stored speech profiles associated with the respective participants. Alternatively, or in addition, the utterances of different speakers can be distinguished based on distinct speech characteristics identified for their utterances, although this may only serve to distinguish, but not identify, the participants. In some examples, the shared device may be configured to identify a participant based on an estimated location of a speaking participant. Various examples of techniques and systems for estimating a location of a person speaking an utterance, such as by use of response delays across an array of microphones, are described in U.S. Pat. No. 8,233,353 (titled "Multi-Sensor Sound Source Localization" and issued on Jul. 31, 2012), U.S. Pat. No. 7,343,289 (titled "System and Method for Audio/Video Speaker Detection" and issued on Mar. 11, 2008), U.S. Pat. No. 7,305,095 (titled "System and Process for Locating a Speaker Using 360 Degree Sound Source Localization" and issued on Dec. 4, 2007), and U.S. Pat. No. 7,254,241 (titled "System and Process for Robust Sound Source Localization" and issued on Aug. 7, 2007, and U.S. Patent Application Publication Numbers US 2016/0275952 (titled "Communicating Metadata that Identifies a Current Speaker" and published on Sep. 22, 2016) and US 2011/0317522 (titled "Sound Source Localization Based on Reflections and Room Estimation" and published on Dec. 29, 2011), each of which are incorporated by reference herein in their entireties.

As noted above, audio responses presented via the virtual assistant interface device 510 are heard by all of the participants 504a, 504b, and 504c at the location 500. Where the virtual assistant identifies a recipient subgroup for a command or query that does not include all of the participants 504a, 504b, and 504c at the location 500, it instead presents a response, or responses, to their recipients via their respective one of devices 506a, 506b, and 506c. In some situations, a device may be able to privately present audio to its participant, allowing a synthesized spoken response to instead be delivered via a device. In some situations, a device may not offer such audio capabilities, and instead the response is presented visually via the device. Thus, a modality used to present a response to a participant may be determined based on the capabilities of one or more devices associated with the participant. In some examples, if the virtual assistant determines, such as according to a rendering policy, that a response should not be shared with all of the participants at a location, the virtual assistant may present verbal indication via the virtual assistant interface device 510 indicating that the response is being presented through another mechanism; for example, the verbal indication could state "I have provided the requested information on your display" and present the response via a display on the requester's device. In some examples, a request for additional information may be presented via a participant device, and/or a response to a request for additional information may be received via a participant device.

In addition, in the example illustrated in FIG. 5, the location 500 includes a display device 520 which may be used by the virtual assistant to display a response to all of the participants. An electronic record may be provided to the virtual assistant identifying the display device 520 as being associated with the location 500, and the electronic record may provide information used by the virtual assistant to make use of the display device 520 (for such as, but not limited to, a network address, access code, password). In an example, the first participant 504a may utter "Hey Cortana, show us the time on the surface hub," and based on the phrase "on the surface hub" (which may be recognized by the virtual assistant as an explicit indication of a device for visually displaying a response) included in the command or query, the virtual assistant provides the response to the participants via the display device 520.

In different implementations, the systems and methods described herein can include provisions for operating in a virtual reality, augmented reality, and/or mixed reality environment. For example, referring now to FIGS. 6-8, various implementations of a virtual session 600 are depicted. For purposes of this application, a virtual session may refer to a spoken conversation session in which one or more participants are associated with, displayed as, or are otherwise provided with an avatar. In one implementation, the avatar may be interactive, such that the avatar is able to move or affect the virtual environment comprising the virtual session 600 in some way. Thus, in some cases, during a virtual session, one or more participants can be perceived by one or more other participants as being represented by an avatar. However, in other implementations, no avatars may be displayed in the virtual session, though each participant may be able to observe other virtual objects, for example virtual objects that are not representative of a participant. Furthermore, in some implementations, the virtual session 600 may be partially or entirely immersive, and/or comprise a mixed reality environment. Various examples of techniques for implementing spoken conversation sessions in VR/AR/MR environments among participants in different locations are described in U.S. Patent Application Publication Numbers US 2017/0085835 (titled "Shared Scene Mesh Data Synchronization" and published on Mar. 23, 2017), US 2017/0038829 (titled "Social Action for Remote Communication" and published on Feb. 9, 2017), US 2016/0350973 (titled "Shared Tactile Interaction and User Safety in Shared Space Multi-Person Immersive Virtual Reality" and published on Dec. 1, 2016), and US 2013/0201276 (titled "Integrated Interactive Space" and published on Aug. 8, 2013), each of which are incorporated by reference herein in their entireties.

Figure 6:
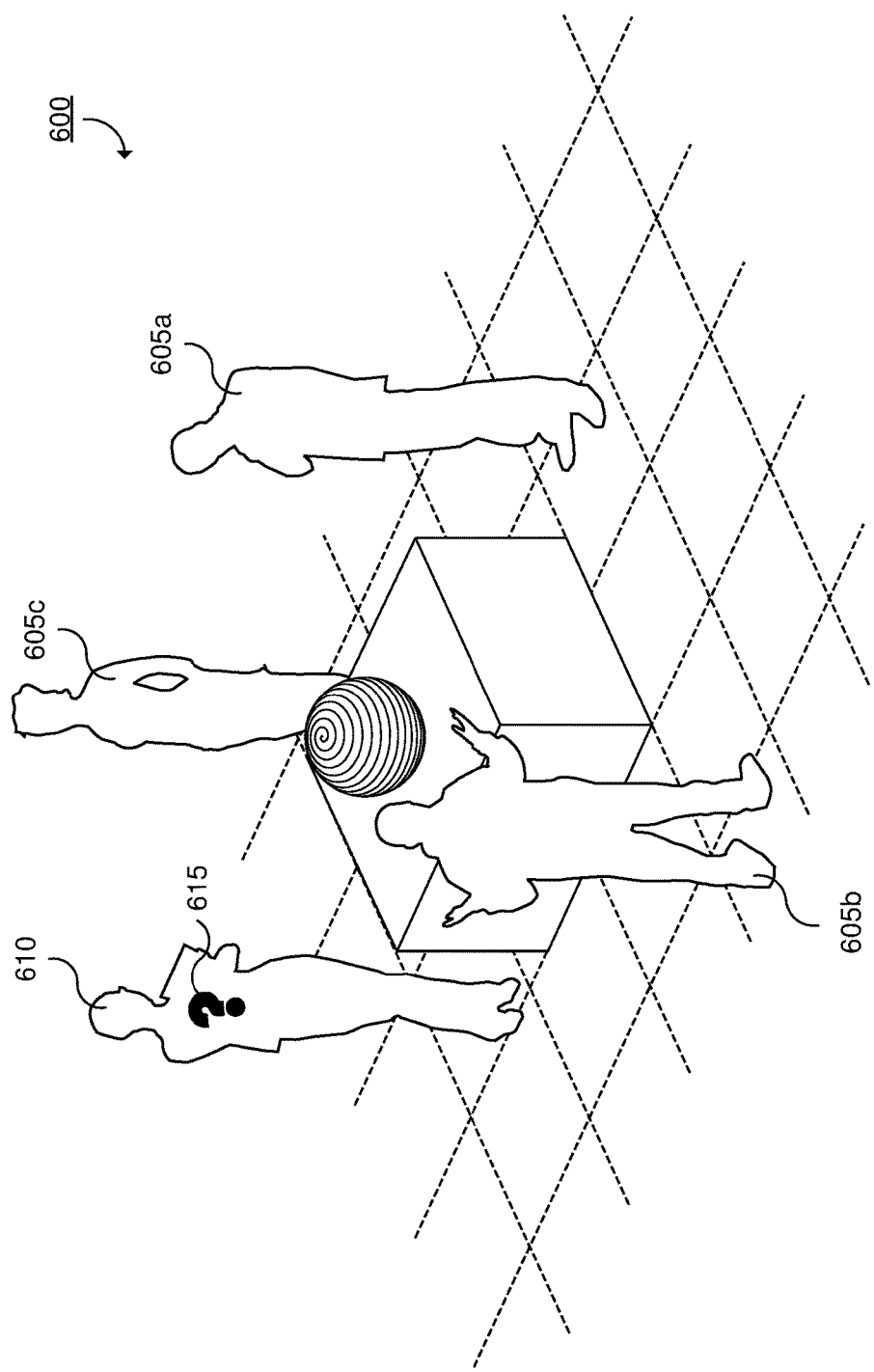
FIG. 6 illustrates an example of a virtual spoken conversation session comprising a collaborative virtual environment with a first participant avatar, a second participant avatar, and a third participant avatar.

FIG. 6 illustrates an example of a virtual session 600 comprising a collaborative virtual environment with a first participant avatar 605a, a second participant avatar 605b, and a third participant avatar 605c. As noted above, in other implementations, there may be one or more participants who are involved or participating in the session but who are doing so without the use or presence of an avatar. In some implementations, each participant avatar can be visible to other participants. Furthermore, in some implementations, the system can include provisions for allowing one or more participants to interact with a virtual assistant, much as described in connection with FIGS. 1-5, during a virtual session while remaining in the immersive virtual environment. For example, in FIG. 6, a virtual assistant avatar 610 is displayed to the participants. The virtual assistant avatar 610 can be a graphical element or interface such as a hologram or other image that can be seen by the participants in the virtual session. In FIG. 6, the virtual assistant avatar 610 is shown as a substantially human figure, similar to the participant avatars.

In some implementations, the virtual assistant avatar 610 may include a virtual indicator 615 that is visible to the participants and can help distinguish the virtual assistant avatar 610 from other virtual objects being presented in the virtual session (such as, for example, the participant avatars). The virtual indicator 610 can comprise any virtual symbol, icon, graphic, image, letters, numbers, or other visual associated with the virtual assistant avatar 610. The virtual indicator 610 presented can be a default graphic, or may be selected by a participant. In other implementations, there may be no virtual indicator associated with the virtual assistant avatar.

It should be understood that while virtual session 600 can be entirely immersive, there may be real-world objects visible to participants and/or which have been integrated into virtual objects. For example, in FIG. 6 the participant avatars are grouped generally around a table, which is a real object for a participant associated with first participant avatar 605a. Furthermore, virtual objects can be displayed to the participants in a manner that accommodates any real objects, such as the virtual sphere depicted as an example in FIG. 6. The virtual sphere is a hologram that is shown as being disposed above or atop the real table. In different implementations, the virtual session may be configured such that participants are able to see both real objects and virtual objects. Thus, in FIG. 6, participants can view and/or interact with the real table and the virtual sphere, as well as the virtual assistant avatar 610.

Figure 7:
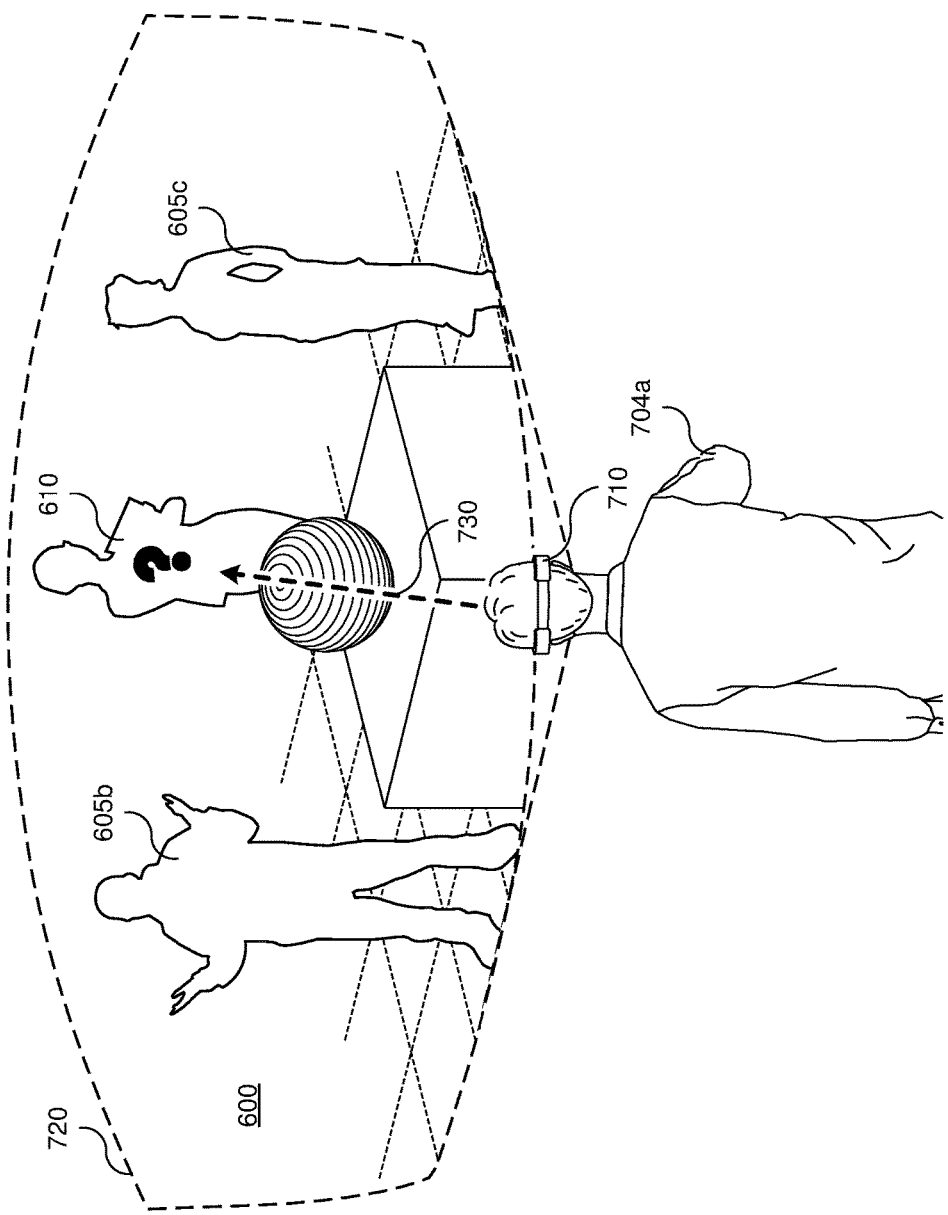
FIG. 7 illustrates an example in which the virtual session of FIG. 6 is depicted through a field of view of a first participant.

Much as described above with respect to other spoken conversation sessions, in some implementations, the virtual assistant may be accessed by participants during a virtual session. In FIGS. 6 and 7, the virtual assistant avatar 610 may be understood to represent a real-time holographic assistant, available to support participants during the virtual session. Furthermore, in some implementations, the participants may be able to address or interact with the virtual assistant by turning or facing toward or directing a gaze toward the virtual assistant avatar 610.

FIG. 7 illustrates an example in which the virtual session 600 of FIG. 6 is depicted through a field of view 710 of a first participant 704a. It should be understood that for purposes of this example, first participant 704a of FIG. 7 was represented in the virtual session 600 by first participant avatar 604a in FIG. 6. In FIG. 7, first participant 704a is wearing a head-mounted display (HMD) device 710. In other implementations, first participant 704a may have access to any device capable of presenting or displaying images to the participant. As first participant 704a views the virtual session 600, the first participant 704a may turn the direction of their head or eye gaze and attend to various aspects being presented. In FIG. 7, the first participant 704a has directed a gaze 730 toward the virtual assistant avatar 610. In some implementations, a gaze that is directed toward the virtual assistant avatar may be used to identify intent to invoke the services of the virtual assistant.

Thus, in some implementations, a participant's gaze can serve as a substitute to the system for a trigger phrase. In other words, the system can be configured to interpret the gaze of a participant as indicating an intent to provide instructions to or address the virtual assistant, rather than spoken words, such as a trigger phrase, that specifically identify the virtual assistant. In one implementation, a gaze directed toward the virtual assistant avatar 610 can trigger the system to utilize spoken cues from utterances spoken while gazing at the virtual assistant avatar 610 to influence a render state for the virtual assistant. As one example, a participant's gaze can move or change during the virtual session. While the participant's gaze is directed away from the virtual assistant avatar 610, spoken utterances may not trigger the services of the virtual assistant. However, utterances spoken while a participant directs their gaze toward the virtual assistant avatar 610 can trigger the services of the virtual assistant. As an example, an utterance by the first participant 704*a* such as "What is the time?" while gazing at the virtual assistant avatar 610 may be understood by the system as a request to the virtual assistant to provide the corresponding response, whether or not the first participant 704*a* utters a trigger phrase.

In some implementations, the use of the trigger phrase may also be utilized during the virtual session. Thus, if the first participant 704*a* utters a trigger phrase (for example, "Hey Cortana") while their gaze is directed away from the virtual assistant avatar 610, the system will process the subsequent utterance as being intended to influence a render state for the virtual assistant. For example, the utterance by the first participant 704*a* such as "Hey Cortana, what is the time?" may be understood by the system as a request to provide the corresponding response, whether or not the first participant 704*a* is gazing toward the virtual assistant avatar 610.

In addition, in different implementations, the system can include provisions for accommodating or incorporating displays or presentation devices that are separate from the holographic elements of the virtual session. For example, participants can collaborate in a virtual session with elements similar to those described above with respect to FIGS. 6 and 7, while another display, such as a surface hub (or some other display or system not associated with the HMD device) remains visible to the participants. In some implementations, the virtual assistant may be configured to provide a response through graphic or audio elements associated with an HMD device, as well as through other available displays (such as the screen 520 of FIG. 5). Thus, in some cases, the virtual assistant can comprise a hybrid system in which the system can render a response through elements of the virtual environment and/or through objects available in the real world.

Figure 8:
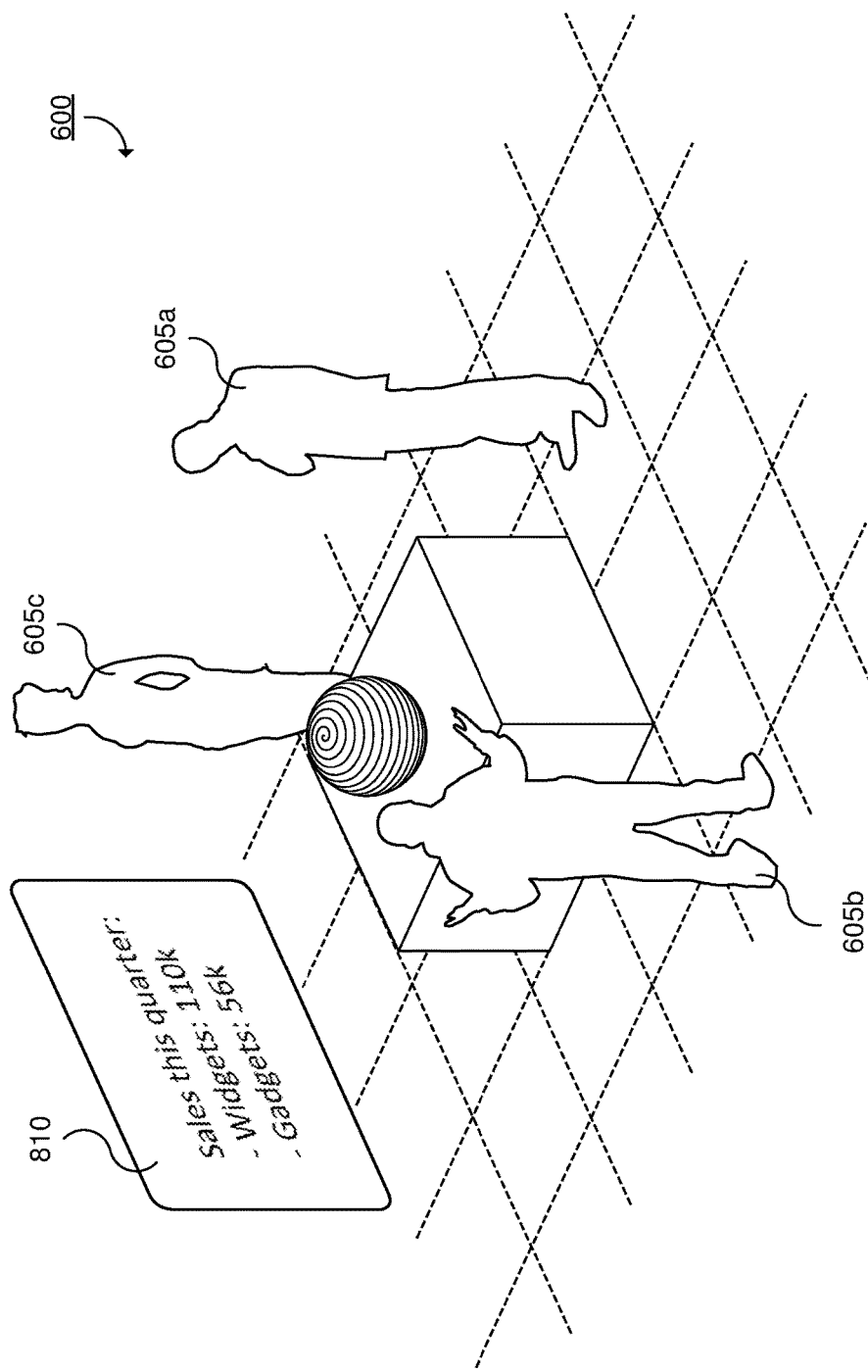
FIG. 8 illustrates another example of the virtual session of FIG. 6.

In different implementations, the system can be configured to present responses to one or more participants in a virtual session through a variety of virtual presentation means. Referring to FIG. 8, in some implementations, participants can invoke the services of the virtual assistant during the virtual session 600, either with a trigger phrase or a directed gaze at a virtual assistant avatar. For example, an utterance may be spoken by the first participant (represented by first participant avatar 605*a*) "Hey Cortana, show us the sales for this quarter." In this case, the response can be displayed as a visual rendering 810 of a corresponding response through a virtual element. In FIG. 8, the visual rendering 810 is provided on a virtual display visible to all of the participants. In other implementations, the virtual assistant can be configured to display the response while also providing an audio response. For example, if the utterance were alternatively spoken as "Hey Cortana, what are the sales for this quarter?" the system could provide the response on a virtual screen or display as well as in an audio format, as permitted by the HMD device.

In different implementations, the responses of the virtual assistant during a virtual session may also be modified by one or more policies as discussed above. For example, certain types of information may be considered sensitive, and a policy may be defined that prevents that information from being included in a response and/or provided to certain participants. Thus, during a virtual session, a participant may utter a phrase such as "Hey Cortana, show us the time" which can trigger a response by the virtual assistant in which each user device provides its own separate display of the time to the respective participant, or where a single virtual element indicating the time, visible to all participants, is added to collaborative scene. However, in cases where the response is to be provided to a select subset of the participants, the time can be displayed as individual displays only in the headset(s) associated with participants who are authorized to receive the response.

Similarly, an utterance comprising "Hey Cortana, tell us the time" can result in an audio response by the virtual assistant that is transmitted to each participant via each HMD device. However, in cases where the response is to be provided to a select subset of the participants, the audio will be played back only in the headset(s) worn by participants who are authorized to receive the response.

In different implementations, the system described herein can be configured to accept various policy settings. For example, the virtual session can include a policy in which audio responses are disabled, and all responses are to be provided via graphical elements. In another example, the audio associated with virtual assistants beyond the virtual assistant of the virtual session may be disabled to help reduce confusion or overlapping responses.

Figure 9:
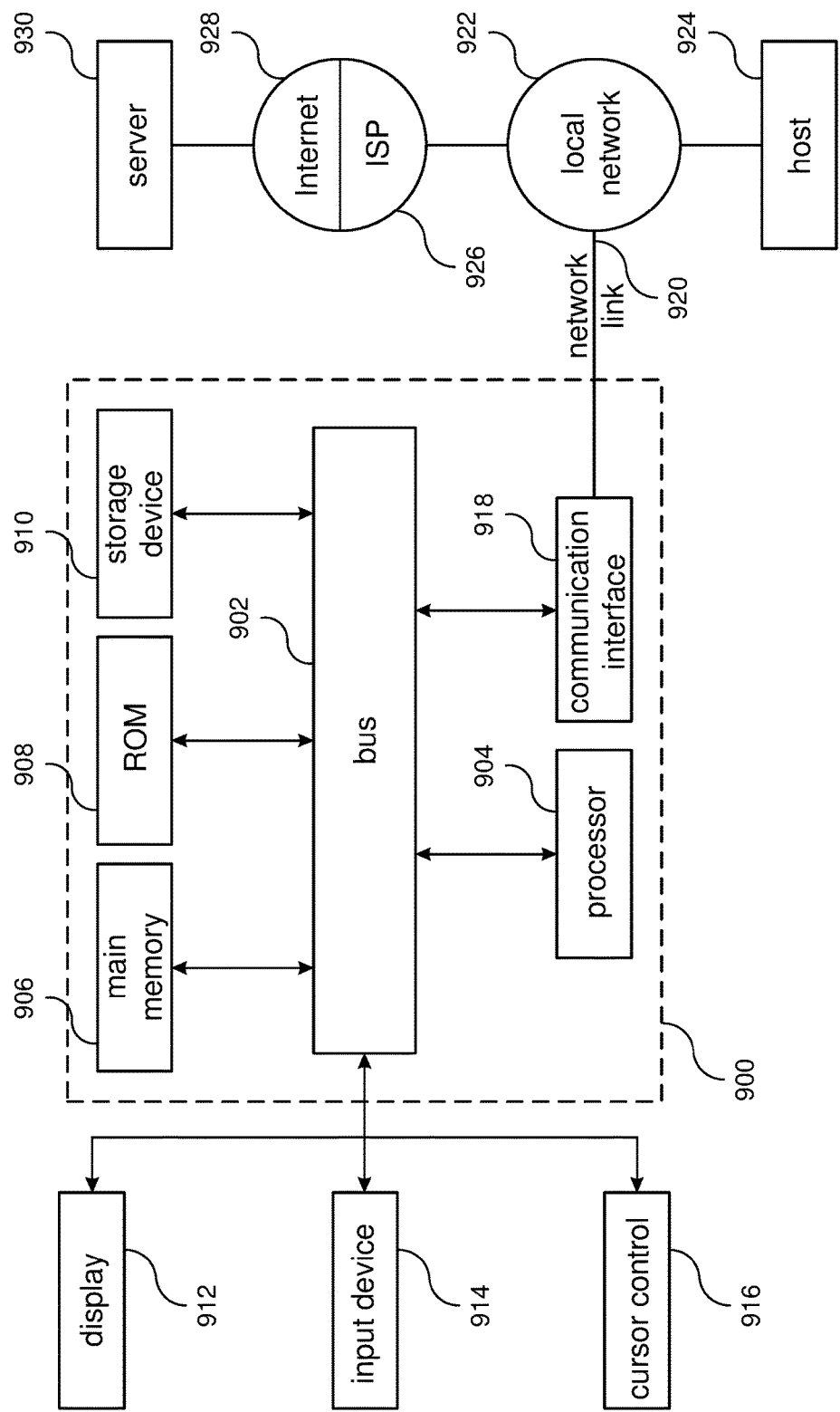
FIG. 9 illustrates a block diagram showing an example computer system upon which aspects of this disclosure may be implemented.

FIG. 9 illustrates a block diagram showing an example computer system 900 upon which aspects of this disclosure may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. The computer system 900 can implement, for example, one or more of, or portions of processing environment 130, external information store 122, external services 124, devices 106*a*, 106*b*, 106*bb*, 106*c*, 306*a*, 306*b*, 306*c*, 406*a*, 406*b*, 406*c*, 506*a*, 506*b*, and 506*c*, virtual assistants 320 and 420, and telecommunications services 330 and 430. The computer system 900 can also implement, for example, one or more of, or portions of the operations illustrated in FIG. 2.

Computer system 900 can further include a read only memory (ROM) 908 or other static storage device coupled to bus 902 for storing static information and instructions for processor 904. A storage device 910, such as a flash or other non-volatile memory can be coupled to bus 902 for storing information and instructions.

Computer system 900 may be coupled via bus 902 to a display 912, such as a liquid crystal display (LCD), for displaying information. One or more user input devices, such as the example user input device 914 can be coupled to bus 902, and can be configured for receiving various user inputs, such as user command selections and communicating these to processor 904, or to a main memory 906. The user input device 914 can include physical structure, or virtual implementation, or both, providing user input modes or options, for controlling, for example, a cursor, visible to a user through display 912 or through other techniques, and such modes or operations can include, for example virtual mouse, trackball, or cursor direction keys.

The computer system 900 can include respective resources of processor 904 executing, in an overlapping or interleaved manner, respective program instructions. Instructions may be read into main memory 906 from another machine-readable medium, such as storage device 910. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 910. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 900 can also include a communication interface 918 coupled to bus 902, for two-way data communication coupling to a network link 920 connected to a local network 922. Network link 920 can provide data communication through one or more networks to other data devices. For example, network link 920 may provide a connection through local network 922 to a host computer 924 or to data equipment operated by an Internet Service Provider (ISP) 926 to access through the Internet 928 a server 930, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for integration of a virtual assistant into a real-time spoken conversation session among a plurality of live participants, the system comprising:
   an interpretation module arranged to:
      receive a first utterance information that expresses a first utterance spoken during the spoken conversation session by a first live participant included in the plurality of live participants of the spoken conversation session, the plurality of live participants including a second live participant, and
      process the received first utterance information using at least one machine-trained model to determine an intent or content for a first command or query included in the first utterance;

a recipient subset(s) selection module configured to selectively identify a first recipient subset of one or more of the plurality of live participants based on at least the determined intent or content for the first utterance, the first recipient subset excluding at least the second live participant;

a response generation module configured to automatically generate, using the virtual assistant, a first response for the first command or query; and a response routing module arranged to selectively provide, during the spoken conversation session, the first response automatically generated by the virtual assistant to the identified first recipient subset without providing the first response to the second live participant.

2. The system of claim 1, wherein:
the interpretation module is further arranged to:
receive a second utterance information that expresses a second utterance spoken during the spoken conversation session by a third live participant included in the plurality of live participants, and
process the received second utterance information using at least one machine-trained model to determine an intent or content for a second command or query included in the second utterance;
the recipient subset(s) selection module is further configured to selectively identify a second recipient subset of the plurality of live participants based on at least the determined intent or content for the second utterance, such that the second recipient subset includes all of the live participants included in the plurality of live participants;
the response generation module is further configured to generate a second response for the second command or query; and
the response routing module is further arranged to provide, during the spoken conversation session, the second response to the identified second recipient subset.

3. The system of claim 1, wherein:
the response generation module is further configured to generate a second response for the received command or query based on the determined intent or content for the first utterance;
the recipient subset(s) selection module is further configured to selectively identify a second recipient subset from the plurality of live participants based on at least the determined intent or content for the first utterance, such that the second recipient subset does not include any live participant included in the first recipient subset; and
the response routing module is further arranged to provide, during the spoken conversation session, the second response to the identified second recipient subset.

4. The system of claim 3, further comprising a render policy evaluation module configured to:
determine that a first type of information is being requested to perform a query for generating the first response or is included in the first response; and
identify, according to a rendering policy defined for the first type of information, a first portion of the first response as not being suitable for presentation to the second recipient subset;
wherein the system is configured to:
include a second portion of the first response in the second response, and
omit the identified first portion from the second response.

5. The system of claim 3, wherein the recipient subset(s) selection module is further configured to:
determine that a first type of information is being requested to perform a query for generating the first response or is included in the first response; and
identify the second recipient subset by selecting live participants from the plurality of live participants according to a rendering policy defined for the first type of information.

6. The system of claim 1, wherein:
the first recipient subset comprises at least a first recipient from the plurality of live participants; and
the system is configured to:
present to the first recipient, during a first period of time during the spoken conversation session, synthesized speech rendered based on the first response,
record, during the presentation of the synthesized speech to the first live recipient, audio including a second utterance spoken by a third live participant included in the plurality of live participants, and
present, after the first period of time and during the spoken conversation session, the recorded audio to the first recipient.

7. The system of claim 1, wherein:
the interpretation module is further arranged to recognize that the first utterance includes a first explicit indication for a response to the first command or query to be rendered visually;
the system further comprises a response rendering module configured to determine to render the first response visually, from a plurality of communication modalities including a synthesized speech audio modality and a visual modality, based on the first utterance being recognized as including the first explicit indication to render a response visually; and
the response routing module is further arranged to cause the first response to be rendered visually to the identified first recipient subset based on the determination to render the first response visually.

8. The system of claim 7, wherein:
the interpretation module is further arranged to recognize that the first utterance includes a second explicit indication of a device for visually displaying a response to the first command or query;
the system further comprises a response module configured to identify a target display device based on the second explicit indication of the device included in the first utterance; and
the response routing module is further arranged to cause the first response to be displayed visually via the identified target display device in response to the identification of the target display device.

9. A method for integration of a virtual assistant into a real-time spoken conversation session among a plurality of live participants, the method comprising:
receiving, a first utterance information that expresses a first utterance spoken during the spoken conversation session by a first live participant included in the plurality of live participants of the spoken conversation session, the plurality of live participants including a second live participant;
processing the received first utterance information using at least one machine-trained model to determine an intent or content for a first command or query included in the first utterance;

selectively identifying a first recipient subset of one or more of the plurality of live participants based on at least the determined intent or content for the first utterance, the first recipient subset excluding at least the second live participant;
automatically generating, using the virtual assistant, a first response for the first command or query; and
selectively providing, during the spoken conversation session, the first response automatically generated by the virtual assistant to the identified first recipient subset without providing the first response to the second live participant.

10. The method of claim 9, further comprising:
receiving a second utterance information that expresses a second utterance spoken during the spoken conversation session by a third live participant included in the plurality of live participants;
processing the received second utterance information using at least one machine-trained model to determine an intent or content for a second command or query included in the second utterance;
selectively identifying a second recipient subset of the plurality of live participants based on at least the determined intent or content for the second utterance, wherein the second recipient subset includes all of the live participants included in the plurality of live participants;
generating a second response for the second command or query; and
providing, during the spoken conversation session, the second response to the identified second recipient subset.

11. The method of claim 9, further comprising:
generating a second response for the received command or query based on the determined intent or content for the first utterance;
selectively identifying a second recipient subset from the plurality of live participants based on at least the determined intent or content for the first utterance, the second recipient subset not including any live participant included in the first recipient subset; and
providing, during the spoken conversation session, the second response to the identified second recipient subset.

12. The method of claim 11, wherein the generating the second response includes:
determining that a first type of information is being requested to perform a query for generating the first response or is included in the first response;
identifying, according to a rendering policy defined for the first type of information, a first portion of the first response as not being suitable for presentation to the second recipient subset;
including a second portion of the first response in the second response; and
omitting the identified first portion from the second response.

13. The method of claim 11, wherein the selectively identifying a second recipient subset includes:
determining that a first type of information is being requested to perform a query for generating the first response or is included in the first response; and
selecting live participants from the plurality of live participants according to a rendering policy defined for the first type of information.

14. The method of claim 9, further comprising:
receiving first audio including a second utterance spoken by from the first live participant during the spoken conversation session before the first utterance;
presenting, during the spoken conversation session and before the first utterance is spoken by the first live participant, the first audio to a third live participant included in the plurality of live participants;
receiving second audio, the second audio including the first utterance spoken by the first live participant; and
determining, according to a policy, not to present the second audio to the third live participant during the spoken conversation session.

15. The method of claim 9, wherein:
the first recipient subset comprises at least a first recipient from the plurality of live participants; and
the method further comprises:
presenting to the first recipient, during a first period of time during the spoken conversation session, synthesized speech rendered based on the first response, recording, during the presentation of the synthesized speech to the first recipient, audio including a second utterance spoken by a third live participant included in the plurality of live participants, and
presenting, after the first period of time and during the spoken conversation session, the recorded audio to the first recipient.

16. The method of claim 9, further comprising:
recognizing that the first utterance includes a first explicit indication for a response to the first command or query to be rendered visually; and
determining to render the first response visually, from a plurality of modalities including a synthesized speech audio modality and a visual modality, based on the first utterance being recognized as including the first explicit indication to render a response visually,
wherein the providing the first response to the identified first recipient subset includes causing the first response to be rendered visually to the identified first recipient subset based on the determination to render the first response visually.

17. The method of claim 16, further comprising:
recognizing that the first utterance includes a second explicit indication of a device for visually displaying a response to the first command or query; and
identifying a target display device based on the second explicit indication of the device included in the first utterance,
wherein the providing the first response to the identified first recipient subset further includes causing the first response to be displayed visually via the identified target display device in response to the identification of the target display device.

18. The system of claim 1, wherein the system is configured to:
receive first audio including a second utterance spoken by the first live participant during the spoken conversation session before the first utterance;
present, during the spoken conversation session and before the first utterance is spoken by the first live participant, the first audio to a third live participant included in the plurality of live participants;
receive second audio, the second audio including the first utterance spoken by the first live participant; and
determine, according to a policy, not to present the second audio to the third live participant during the spoken conversation session.

19. The system of claim 1, further comprising:

a display device; and an eye gaze tracking module configured to determine a gaze direction of the first participant;

wherein the system is configured to:
- display, via the display device, a virtual environment to the first live participant,
- display, via the display device and as part of the virtual environment, a first participant avatar provided for one of the plurality of live participants,
- display, via the display device and as part of the virtual environment, a virtual assistant avatar for the virtual assistant, and wherein the virtual assistant is used to generate the first response in response to the gaze direction of the first live participant being directed to the displayed virtual assistant avatar while the first utterance is spoken.

20. The method of claim 9, further comprising displaying, via a display device, a virtual environment to the first live participant;

displaying, via the display device and in the virtual environment, a first participant avatar provided for one of the plurality of live participants, displaying, via the display device and in the virtual environment, a virtual assistant avatar for the virtual assistant; and determining a gaze direction of the first participant;

wherein the virtual assistant is used to generate the first response in response to the gaze direction of the first live participant being directed to the displayed virtual assistant avatar while the first utterance is spoken.

* * * * *